US008353767B1

(12) United States Patent
Borst et al.

(10) Patent No.: US 8,353,767 B1
(45) Date of Patent: Jan. 15, 2013

(54) SYSTEM AND METHOD FOR A VIRTUAL CHARACTER IN A VIRTUAL WORLD TO INTERACT WITH A USER

(75) Inventors: Karl Joseph Borst, Toronto (CA); Jessica Boyd, Etobicoke (CA); Sally Christensen, Richmond Hill (CA)

(73) Assignee: Ganz, Woodbridge, Ontario ( * ) Notice: Subject to any disclaimer, the term of this patent is extended or adjusted under 35 U.S.C. 154(b) by 1063 days.

(21) Appl. No.: 12/172,677

(22) Filed: Jul. 14, 2008

Related U.S. Application Data

(60) Provisional application No. 60/949,764, filed on Jul. 13, 2007.

(51) Int. Cl.
*A63F 13/00* (2006.01)
*A63F 9/24* (2006.01)
*G06F 17/00* (2006.01)
*G06F 17/20* (2006.01)

(52) U.S. Cl. .......................................... 463/31; 463/42
(58) Field of Classification Search ................ 463/1, 31, 463/42; 345/473; 446/297
See application file for complete search history.

(56) References Cited

U.S. PATENT DOCUMENTS

| | | | |
|---|---|---|---|
| 5,411,259 A | 5/1995 | Pearson | |
| 5,880,731 A | 3/1999 | Liles et al. | |
| 5,885,156 A * | 3/1999 | Toyohara et al. | ................ 463/1 |
| 5,890,963 A | 4/1999 | Yen | |
| 5,966,526 A | 10/1999 | Yokoi | |
| 6,009,458 A | 12/1999 | Hawkins et al. | |
| 6,031,549 A | 2/2000 | Hayes-Roth | |
| 6,056,618 A * | 5/2000 | Larian | ................ 446/73 |
| 6,134,548 A * | 10/2000 | Gottsman et al. | ............ 705/26.9 |
| 6,171,189 B1 * | 1/2001 | Katano et al. | .................. 463/43 |
| 6,175,857 B1 | 1/2001 | Hachiya et al. | |
| 6,219,045 B1 | 4/2001 | Leahy et al. | |
| 6,227,966 B1 | 5/2001 | Yokoi | |
| 6,253,167 B1 * | 6/2001 | Matsuda et al. | ................ 703/11 |

(Continued)

FOREIGN PATENT DOCUMENTS

EP       1382372 A1       1/2004

(Continued)

OTHER PUBLICATIONS

"IGN's Complete Guide to Pokemon: Blue and Red", IGN, available on or before Apr. 27, 2006, retrieved from <http://web.archive.org/web/20060427131258/http://guides.ign.com/guides/16708/> on Sep. 4, 2010, 26 pages.*

(Continued)

*Primary Examiner* — Dmitry Suhol
*Assistant Examiner* — Jason Skaarup
(74) *Attorney, Agent, or Firm* — Pearne & Gordon LLP

(57) ABSTRACT

A virtual presentation for entertaining a user, and includes generating a virtual environment that includes at least one virtual object, and displaying a virtual character in the virtual environment. The virtual character is to be controlled in the virtual environment to interact with the virtual object responsive to commands input by the user via a user computer. The method further includes evaluating a parameter associated with at least one of the virtual object and the virtual character and, responsive to the evaluating, preparing a communication from the virtual character to be transmitted to the user. The communication includes content related to the parameter evaluated and is transmitted from the virtual character to the user with the user computer.

31 Claims, 22 Drawing Sheets

U.S. PATENT DOCUMENTS

| | | | |
|---|---|---|---|
| 6,267,672 B1 | 7/2001 | Vance | |
| 6,267,677 B1* | 7/2001 | Tajiri et al. | 463/43 |
| 6,273,815 B1 | 8/2001 | Stuckman et al. | |
| 6,290,565 B1 | 9/2001 | Galyean III et al. | |
| 6,311,195 B1 | 10/2001 | Hachiya et al. | |
| 6,347,993 B1* | 2/2002 | Kondo et al. | 463/1 |
| 6,404,438 B1 | 6/2002 | Hatlelid | |
| 6,406,370 B1* | 6/2002 | Kumagai | 463/31 |
| 6,466,213 B2* | 10/2002 | Bickmore et al. | 345/473 |
| 6,476,830 B1 | 11/2002 | Farmer et al. | |
| 6,522,333 B1 | 2/2003 | Hatlelid | |
| 6,539,400 B1 | 3/2003 | Bloomfield et al. | |
| 6,554,679 B1 | 4/2003 | Shackelford et al. | |
| 6,560,511 B1 | 5/2003 | Yokoo et al. | |
| 6,587,751 B2* | 7/2003 | Takamura et al. | 700/245 |
| 6,595,858 B1 | 7/2003 | Tajiri et al. | |
| 6,606,104 B1* | 8/2003 | Kondo et al. | 715/764 |
| 6,609,968 B1 | 8/2003 | Okada et al. | |
| 6,616,532 B2 | 9/2003 | Albrecht | |
| 6,684,127 B2* | 1/2004 | Fujita et al. | 700/245 |
| 6,692,328 B1* | 2/2004 | Reinberg et al. | 446/142 |
| 6,704,784 B2 | 3/2004 | Matsuda et al. | |
| 6,711,467 B2* | 3/2004 | Inoue et al. | 700/245 |
| 6,718,231 B2* | 4/2004 | Konno et al. | 700/245 |
| 6,722,973 B2* | 4/2004 | Akaishi | 463/1 |
| 6,722,989 B1* | 4/2004 | Hayashi | 463/43 |
| 6,729,884 B1 | 5/2004 | Kelton et al. | |
| 6,745,236 B1 | 6/2004 | Hawkins et al. | |
| 6,758,746 B1 | 7/2004 | Hunter | |
| 6,773,325 B1 | 8/2004 | Mawle et al. | |
| 6,910,186 B2 | 6/2005 | Kim | |
| 6,918,833 B2 | 7/2005 | Emmerson et al. | |
| 6,931,656 B1* | 8/2005 | Eshelman et al. | 725/37 |
| 6,951,516 B1* | 10/2005 | Eguchi et al. | 463/40 |
| 6,959,166 B1 | 10/2005 | Gabai et al. | |
| 7,061,493 B1 | 6/2006 | Cook et al. | |
| 7,073,129 B1* | 7/2006 | Robarts et al. | 715/740 |
| 7,089,083 B2 | 8/2006 | Yokoo et al. | |
| 7,146,095 B2* | 12/2006 | Asami | 386/200 |
| 7,155,680 B2 | 12/2006 | Akazawa et al. | |
| 7,171,154 B2 | 1/2007 | Fujisawa | |
| 7,179,171 B2 | 2/2007 | Forlines et al. | |
| 7,181,690 B1 | 2/2007 | Leahy et al. | |
| 7,191,220 B2 | 3/2007 | Ohwa | |
| 7,208,669 B2 | 4/2007 | Wells et al. | |
| 7,229,288 B2 | 6/2007 | Stuart et al. | |
| 7,249,139 B2 | 7/2007 | Chuah et al. | |
| 7,300,344 B2* | 11/2007 | Fujioka et al. | 463/4 |
| 7,314,407 B1 | 1/2008 | Pearson | |
| 7,371,177 B2* | 5/2008 | Ellis et al. | 463/42 |
| 7,396,281 B2 | 7/2008 | Mendelsohn et al. | |
| 7,468,728 B2 | 12/2008 | Watt | |
| 7,478,047 B2 | 1/2009 | Loyall et al. | |
| 7,645,178 B1 | 1/2010 | Trotto et al. | |
| 7,744,467 B2* | 6/2010 | Sogabe | 463/42 |
| 7,747,350 B2* | 6/2010 | Matsuzaki et al. | 700/245 |
| 7,823,074 B2* | 10/2010 | Takemura et al. | 715/757 |
| 7,843,471 B2 | 11/2010 | Doan et al. | |
| 7,862,428 B2* | 1/2011 | Borge | 463/29 |
| 2001/0002365 A1 | 5/2001 | Minakuchi et al. | 455/556 |
| 2001/0006909 A1* | 7/2001 | Mirasaki et al. | 463/35 |
| 2002/0002514 A1 | 1/2002 | Kamachi et al. | |
| 2002/0024312 A1* | 2/2002 | Takagi | 318/568.12 |
| 2002/0037768 A1* | 3/2002 | Ohshima | 463/30 |
| 2002/0080193 A1* | 6/2002 | Muthusamy et al. | 345/848 |
| 2002/0082077 A1 | 6/2002 | Johnson et al. | |
| 2002/0090985 A1* | 7/2002 | Tochner et al. | 463/1 |
| 2002/0094851 A1 | 7/2002 | Rheey | |
| 2002/0098879 A1* | 7/2002 | Rheey | 463/1 |
| 2002/0113809 A1 | 8/2002 | Akazawa et al. | |
| 2002/0119810 A1 | 8/2002 | Takatsuka et al. | |
| 2002/0130894 A1 | 9/2002 | Young et al. | |
| 2002/0160835 A1* | 10/2002 | Fujioka et al. | 463/31 |
| 2003/0003839 A1* | 1/2003 | Lin | 446/175 |
| 2003/0080987 A1* | 5/2003 | Rosenberg | 345/701 |
| 2003/0137515 A1* | 7/2003 | Cederwall et al. | 345/473 |
| 2004/0043806 A1 | 3/2004 | Kirby et al. | |
| 2004/0053690 A1* | 3/2004 | Fogel et al. | 463/31 |
| 2004/0082255 A1* | 4/2004 | Fong et al. | 446/75 |
| 2004/0093266 A1 | 5/2004 | Dohring | |
| 2004/0143852 A1 | 7/2004 | Meyers | |
| 2004/0219961 A1* | 11/2004 | Ellenby et al. | 463/1 |
| 2004/0242326 A1 | 12/2004 | Fujisawa | |
| 2004/0259465 A1* | 12/2004 | Wright et al. | 446/297 |
| 2005/0049725 A1 | 3/2005 | Huang | |
| 2005/0059483 A1 | 3/2005 | Borge | |
| 2005/0137015 A1 | 6/2005 | Rogers et al. | |
| 2005/0148390 A1* | 7/2005 | Murase et al. | 463/40 |
| 2005/0177428 A1 | 8/2005 | Ganz | |
| 2005/0182693 A1 | 8/2005 | Alivandi | |
| 2005/0250415 A1 | 11/2005 | Barthold | |
| 2005/0250416 A1 | 11/2005 | Barthold | |
| 2006/0079150 A1 | 4/2006 | Filoseta et al. | |
| 2006/0100018 A1 | 5/2006 | Ganz | |
| 2006/0181535 A1 | 8/2006 | Watt | |
| 2006/0270312 A1* | 11/2006 | Maddocks et al. | 446/337 |
| 2007/0050716 A1 | 3/2007 | Leahy et al. | |
| 2007/0099685 A1 | 5/2007 | Van Luchene | |
| 2007/0128979 A1* | 6/2007 | Shackelford et al. | 446/484 |
| 2007/0130001 A1 | 6/2007 | Jung et al. | |
| 2007/0143679 A1 | 6/2007 | Resner | |
| 2007/0162870 A1* | 7/2007 | Nakagawa et al. | 715/811 |
| 2007/0197297 A1 | 8/2007 | Witchey | |
| 2007/0211047 A1 | 9/2007 | Doan et al. | |
| 2008/0039166 A1* | 2/2008 | Harris et al. | 463/8 |
| 2008/0163055 A1 | 7/2008 | Ganz | |
| 2008/0207327 A1* | 8/2008 | Van Luchene et al. | 463/42 |
| 2011/0265044 A1* | 10/2011 | Ganetakos et al. | 715/835 |

FOREIGN PATENT DOCUMENTS

| | | |
|---|---|---|
| EP | 1776990 A2 * | 4/2007 |
| WO | 01/69829 A2 | 9/2001 |
| WO | 0190841 A1 | 11/2001 |
| WO | WO 0213935 A1 * | 2/2002 |
| WO | 0222224 A1 | 3/2002 |
| WO | WO 2004104736 A2 * | 12/2004 |
| WO | WO 2006114625 A2 * | 11/2006 |

OTHER PUBLICATIONS

Earthworm Jim for SNES—Gamespot—Oct. 1994—URL <http://www.gamespot.com/snes/action/earthwormjim/similar.html?mode=versions>—accessed on Apr. 18, 2011.

Worst Water Levels—Earthworm Jim—GamesRadar—Oct. 1994—URL <http://www.gamesradar.com/f/the-absolute-worst-waterlevels/a-20091 00711214920020>—accessed on Apr. 18, 2011.

Chicken Little: Fish out of Water's Fish n' Ship—Online Game—2006—URL <http://www.dandare.org/FreeFun/Games/CartoonsMoviesTV/ChickenLittle/ChickenLittle2.htm>—accessed on Apr. 18, 2011.

"The Sims Booklet," dated 2000.

Grace, "Web Site Tycoon's Next Goal: Sixth Grade"; Woonsocket Call, Jun. 19, 2002.

http://web.archive.org.web.20031202190119/www.monopets.com/, Dec. 2, 2003.

de Sevin, Etienne; et al, "An Affective Model of Action Selection for Virtual Humans," Swiss Federal Institute of Technology; 2005.

Matsuda, Kouichi. "Evaluation of Personal Agent-Oriented Virtual Society-PA." Presence 10, 2; 2001: 160-174.

Don Burleson Blog, "Scuba Diving Horses & Dogs & Cats", Sep. 9, 2005.

Multiply website, Futurama Fish Thingy, 2 pg, Oct. 2006.

Multiply website Futurama Fish Thingy, 1 pg, Oct. 2006.

IGN website Futurama DVD Review, Mar. 2003.

Amazon.com website DVD information of Futurama Volume One, dated Mar. 13, 2003, source: archive.org. 2003.

Gizmo Watch Terranaut, Sep. 17, 2006.

Amazon.com "Watchmen Book",Nov. 24, 2006. Source: archive.com.

Watchmen Absolute edition image, Nov. 2006.

Watchmen Absolute edition image—close up of exile to Mars, Nov. 2006.

* cited by examiner

SYSTEM AND METHOD FOR A VIRTUAL CHARACTER IN A VIRTUAL WORLD TO INTERACT WITH A USER

CROSS-REFERENCES TO RELATED APPLICATIONS

This application claims the benefit of U.S. Provisional Application Ser. No. 60/949,764 filed on Jul. 13, 2007, which is incorporated herein by reference in its entirety.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by the law, but otherwise reserves all copyright rights whatsoever.

FIELD OF THE INVENTION

This application relates generally to a system and method for presenting a virtual character in a virtual presentation.

More specifically, this application relates to an Entertainment System including a virtual environment in combination with a commercially purchased toy, wherein the system allows a toy user to register the toy within the virtual environment using a registration code and presents a virtual character that represents the toy in the virtual world. With the virtual character, also referred to herein as a virtual representation, the user access to various activities and scenarios in the virtual world via a computer connected to the Internet. The virtual character can also respond to its environment to issue a communication intended for the user, thereby enhancing interactions between the user and the virtual character.

BACKGROUND OF THE INVENTION

Typically, computer generated images representing a character in a virtual world only receive input from a user via a user computer. The user can input control commands, prompt the virtual character to perform desired actions, and otherwise carry on a one-way relationship with the virtual character. While such virtual characters can entertain the user for a period of time, the user will eventually begin to realize the lack of mutual interactions, and may lose interest in the virtual character.

More recently, virtual characters in a virtual, computer-generated environment have been given the ability to output a statement to the user. Such statements can be in the form of a text string visually displayed on a monitor provided to the user computer, or audibly via speaker coupled to a sound card of the user computer. However, such known statements are simply general statements that are only output at scheduled timed intervals. As such, the statements from the virtual character lack any sort of personalized, spontaneous quality. Further, since the statements from the virtual character are only time based, they are not relevant to incidents that are occurring in the virtual world. These impersonal, general statements eventually lead the user to realize that what may have once been considered to be communications from the virtual character are actually just cold expressions resulting from the expiration of a period of time.

Moreover, the general statements issued by virtual characters of conventional virtual presentations do not convey useful information to the user. Such general statements are often generic, and issued to all users. Such statements from virtual characters that often have the full attention of the user fail to take advantage of an opportunity for the entity behind the virtual character to present marketing and other promotional information to the user, to encourage further interactions, or further develop the relationship bond between the user and the virtual character.

Accordingly, there is a need in the art for a method and system for creating a virtual world and allowing interaction between virtual characters to enhance the relationship between a user and the virtual character, and to take advantage of possible marketing potential.

SUMMARY OF THE INVENTION

Provided is a method of providing a virtual presentation for entertaining a user. The method comprises generating a virtual environment that includes at least one virtual object; displaying a virtual character that represents a real-world item in the virtual environment, wherein the virtual character is to be controlled in the virtual environment to interact with the virtual object responsive to commands input by the user via a user computer; and evaluating a parameter associated with at least one of the virtual object and the virtual character. Responsive to the evaluating, preparing a communication from the virtual character to be transmitted to the user is also performed, wherein the communication includes content related to the parameter evaluated. The method further comprises initiating transmission of the communication from the virtual character to the user with the user computer.

Also provided is a method of providing a virtual presentation for entertaining a user. The method comprises generating a virtual environment; displaying a virtual character in the virtual environment, wherein the virtual character is associated with at least one parameter, the at least one parameter comprising at least one of a hunger parameter, a clothing parameter, a furniture parameter, an activity parameter and a neglect parameter; and evaluating a value of the at least one parameter associated with the virtual character. Responsive to evaluating, the method further comprises preparing a communication from the virtual character to be transmitted to the user, wherein the communication includes content related to the at least one parameter evaluated; and initiating transmission of the communication from the virtual character to the user by the user computer.

Further provided is an entertainment system for allowing interaction between a virtual character and a user. The entertainment system comprises a computer-based virtual world component operative to generate a virtual environment that includes at least one virtual object; and a computer-based virtual character component operative to display a virtual character that represents a real-world item in the virtual environment, wherein the virtual character is to be controlled in the virtual environment to interact with the virtual object responsive to commands input by the user via a user computer. The entertainment system further comprises a computer-based evaluation component operative to evaluate a parameter associated with at least one of the virtual object and the virtual character; and a computer-based communication component operative to, in response to evaluation of the parameter, prepare a communication from the virtual character to be transmitted to the user, wherein the communication includes content related to the parameter evaluated. A computer-based transmission component is operative to initiate transmission of the communication from the virtual character to the user with the user computer.

Still further provided is a computer readable medium for storing computer readable program code for performing the method disclosed herein by utilizing a computer system, as also disclosed herein.

DETAILED DESCRIPTION OF THE PREFERRED EMBODIMENTS

Figure 1:
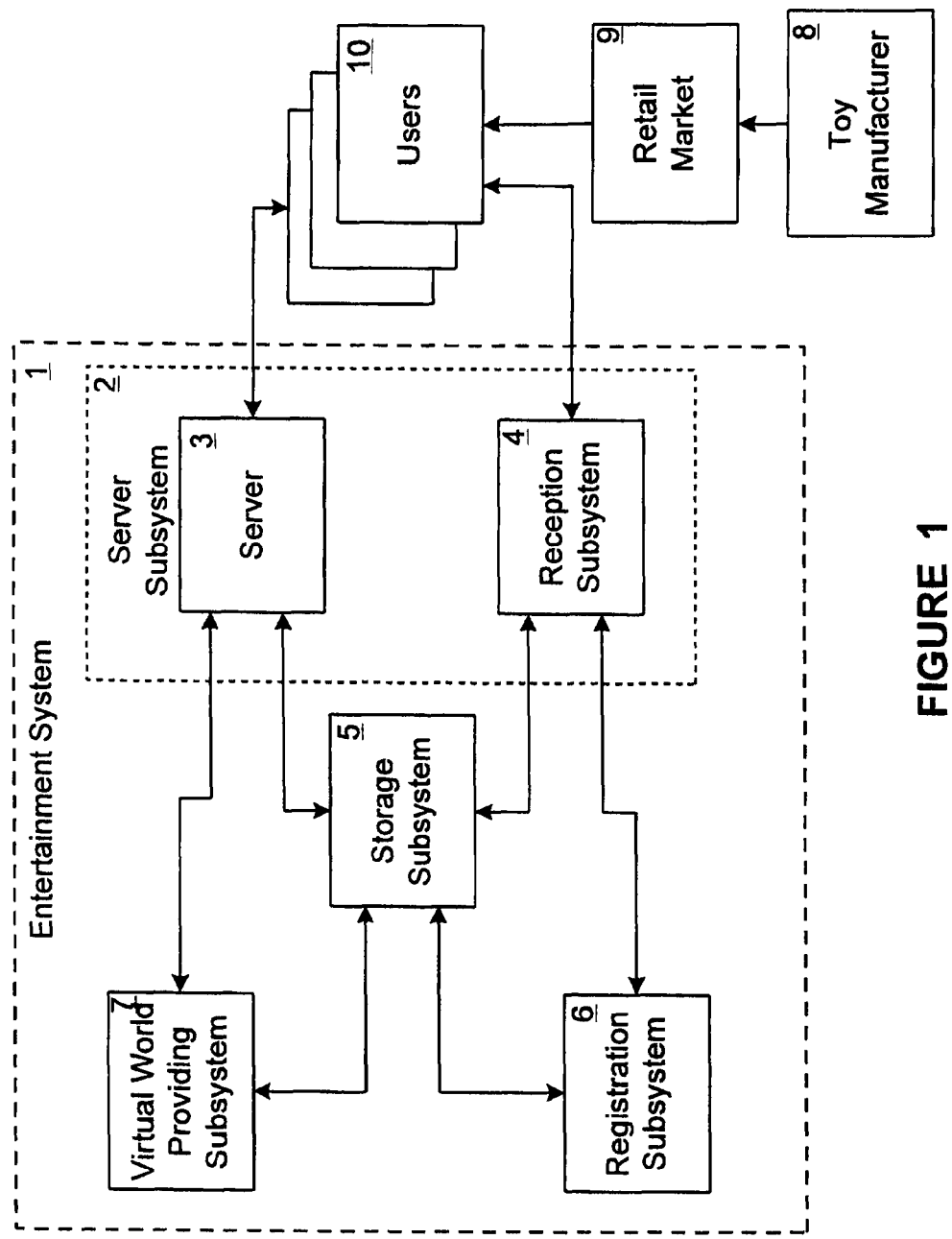
FIG. 1 shows a schematic block diagram of a current embodiment of the system and its interactions with some external entities.

Provided is an Entertainment System including an online "virtual world", also referred to herein as a "virtual environment" where the user of a toy, for example, can register the toy using a registration number provided with the toy when purchased or otherwise associated with the toy, adopt the toy online, and play with a virtual representation of the toy (referred to herein as the "virtual character") in the virtual world. Although the virtual character is described herein as representing a real-world item in the virtual environment and being generated in response to registration of a code associated with the real-world item, it is to be noted that the claimed invention is not so limited. Instead, the claimed invention can be utilized to facilitate communications from any virtual character in any virtual environment to the user via a user computer.

In an illustrative embodiment, mostly as implemented by computer executable instructions read from a computer-readable medium and executed on a programmed computer, e.g a client and/or server over a network. The "virtual environment" can be implemented using an interactive website via a user computer connected to the Internet. In this manner, a user can play with the virtual character in a computer generated fantasy world (i.e., the virtual environment). Examples of the computer-readable medium suitable for storing the computer executable instructions include a magnetic or solid-state hard disk drive ("HDD") provided to a personal computer, server and the like; an optical storage medium such as a compact disc ("CD"), digital versatile disc ("DVD") and the like; electronically erasable programmable read-only memory ("EEPROM") such as a USB flash drive and the like; and any other medium that can store the computer executable instructions in a format that can be retrieved and parsed by the user computer.

Graphics, animation, sound, and even recorded images might be utilized to generate this virtual environment. Even live images might be utilized, if desired. In addition, other sources of material can also be utilized. In essence, the virtual environment creates an interactive playland for the toy owner to encourage imagination using the toy, and at the same time, provide an incentive to purchase additional toys or encourage additional individuals to also purchase toys in order to participate in the Entertainment System.

Throughout this disclosure, the term "virtual" is used, for example, to describe the user perceivable, e.g., viewable/hearable material presented to the user on the user computer from data and/or computer programs and commands generated and/or provided by the Entertainment System, to the user computer running one or more computer applications (e.g., a web browser with the appropriate plug-ins, applets, and/or other support programs, etc.). The System can provide the data and/or programs, via a communication network connected to the System and the user computer (e.g., the Internet). According to alternate embodiments the data and/or programs, or at least a portion thereof, can be stored locally by the user computer and parsed or otherwise executed to present the virtual environment to the user.

The term "virtual" does not necessarily mean that the displayed item is not "real", because the displayed item could, for example, be a video or picture of a real-world item, for example. Furthermore, the "virtual environment" is presented using "real" physical phenomena (e.g., light and sound), and is impacted by "real" user interactions (e.g., mouse and keyboard manipulations). Rather, the term "virtual" is used to describe the computer generated and/or provided presentation to the user, including both visual and audible effects, via the user computer. It is a "virtual environment" in the sense that it is primarily a computer presented fantasy world with which the user can interact via manipulations of the user computer. In this manner, the "virtual" items of the virtual environment can be presented as interacting with each other and with the user. Furthermore, the user is provided access to games and trivia as well.

Likewise, the phrase "real-world item" refers to an actual item that exists in reality, such as an animal, person, vehicle, and any other tangible items that are commonly encountered in reality. However, according to alternate embodiments real-world items do not exist in reality but can be any animal, person, vehicle, and the like that exists in a fictional environment, such as a dinosaur, a dragon, a character in a story, and the like, that can be represented by a toy.

In an embodiment, the virtual environment provides a biography of the toy, a virtual representation of the toy (i.e., the virtual character) using graphics and/or sound (such as an animated image, for example) to participate in games and activities. For embodiments where the virtual character does not actually represent a real-world item, the virtual character can have any desired appearance, not necessarily limited to a virtual representation of a toy, or any other real-world item. The system also provides a virtual means for maintaining the "health and well-being", which comprises at least one of a health, happiness and hunger of the virtual character through various maintenance activities, such as virtual feeding and playing, virtual shopping, and virtual medical checkups, for example.

Furthermore, the Entertainment System can be utilized for marketing additional toys and/or accessories and/or services related to the toy to allow restricted access to additional online activities and features to those who purchase the toys.

The Entertainment System of the current embodiment may provide some general services and features open to the public, such as information about the toys and where to purchase them, a description of the features of the website, and other similar information. However, one of the purposes of the entertainment system in the current embodiment is to foster two-way communications between the virtual character and the user to keep the user intrigued with the virtual character. For embodiments where the virtual character represents a toy, this will help to maintain the relationship between the user and the toy, and encourage the public to purchase the toy or other real-world item and obtain a registration code for access to the primary features and services. Alternate embodiments foster communications as described herein to encourage the user to visit a portion of the virtual environment, purchase real and/or virtual items and accessories, and other such activities. Accordingly, the primary features of the System can optionally be restricted to registered users. The existence of the System may encourage initial sales of the toy and other real-world items by new users (such as via word-of-mouth from current users), and the System will also encourage the purchase of additional toys by current users.

Online sales may be supported and encouraged in an alternate embodiment, but in the current embodiment the invention is intended to be utilized to sell toys in retail establishments. Thus, the invention can be utilized as a marketing tool, utilizing word-of-mouth and the desire to increase participation in the virtual environment, and possibly makes the toys and other real-world items more attractive to retail merchants and increases their sales.

In essence, the present invention in its current embodiment provides an Entertainment System including an online virtual environment with a virtual character representing a toy or other real-world item purchased at a retail store or otherwise acquired new by the user, for example. Examples of toys that the virtual character can represent include plush toy animals, as well as accessories for the plush toy animals. These accessories can also optionally be provided with a registration code to be entered into a website and validated as described elsewhere herein for validation of the code provided to the plush toy animal. Once validated, the accessories can also optionally be represented in the online virtual environment as "virtual accessories" to be used along with the virtual character just as the real-world accessories are used along with the real-world plush toy animals. For example, a registration code provided to an article of clothing for the real-world plush toy animal can be entered into the website and validated by the website to create a virtual version of that article of clothing in the virtual environment to be worn by the virtual character. However, there is no limit to the type of toy that the system could support, as long as the toy can be represented by a virtual replica. The virtual character, according to other embodiments, however, can be any computer-generated or otherwise displayed by a computer in the virtual environment, regardless of whether it represents a toy or any other real-world item.

To clearly describe various features of the claimed invention, the following exemplary embodiments including a virtual character that represents a toy is set forth below, keeping in mind that the virtual character does not necessarily have to represent a toy, or any real-world item for that matter. The current system functions basically as follows:

A consumer purchases a toy (such as the plush toy animal representing a particular animal, for example, or some other toy). The toy includes a tag attached to the toy body or the toy packaging (or alternatively, another indicator and/or a storage device) providing instructions on how to register the toy and gain access to the virtual character that represents the toy. For example, the tag can indicate a web site address and a registration code. The user can load the System web site using the web address in a browser application running on the user's computer, and then enter the registration code to register the toy, thereby obtaining access to restricted portions of the System website.

In an alternate embodiment, the code can be automatically entered via the storage device, for example, for automatically loading, and/or downloading, and/or registering the user with the System.

Registration allows the user to participate in a virtual adoption process utilizing a virtual online replica of the toy (the "virtual toy") to provide an analogous online representation of the toy. The virtual toy can optionally look somewhat like the toy (e.g., same type of toy, similar shapes, color patterns, etc.), but could be more "cartoonized", for example, and can be animated, which may or may not be the case for the real toy.

The registered user can then participate in various activities both for enjoyment, and to virtually "maintain" the virtual toy in a happy, healthy, contented state.

The System of the current embodiment utilizes a server subsystem including a web server subsystem for generating both dynamic and static web pages as is known in the art, and for receiving data and/or commands from the user computer. One or more databases support the functioning of this server subsystem. The web server utilizes various scripting or other executable programs for providing dynamic content to the user's computer, which is attached to the web server via some computer network, such as the Internet, for example. The web server can also utilize various animated motion programs, such as a Flash program, java scripts, etc., to provide dynamic content to the user.

FIG. 1 shows a top-level block diagram of the Entertainment System 1, interacting with various users 10. The users 10 should have previously purchased and registered one or more toys from a Retail Merchant 9, who obtained the toys from a manufacturer 8, or via a distributor.

If the user has not yet purchased a toy, he can still access the System 10 to obtain information about the System and/or the toys, but will not, in the current embodiment, have access to much of the site until a toy is purchased and registered.

The Entertainment System 1 is comprised of a server subsystem 2 for interacting with the users 10 via a user computer being operated by the user. The server subsystem can utilize a server 3, for serving content, including web pages, data, commands, and/or programs, for example, to the user computer. In addition, the server subsystem can include a reception subsystem 4, for receiving information and commands from the users 10. Alternatively, the server 3 and reception subsystem 4 might be combined into a single computer application, such as a commercially available web server, for example, running on one or more computers. The current system will utilize commercially available applications to implement much of the server subsystem.

The Entertainment System 1 also comprises a Storage Subsystem 5, for storing system data, user IDs and passwords, toy registration codes, personalized user information, etc. utilized by the various subsystems. The Storage Subsystem 5 of the current system will utilize a commercially available database application running on commercially available hardware, for example.

A Registration Subsystem 6 is used for registering the user and the user's toy into the system, so that the user has access to restricted portions of the system. The Registration Subsystem 6 may utilize its own dedicated application and hardware, or could be combined with or share the Server Subsystem 2 applications and/or hardware. The registration subsystem examines the registration code against stored data relating to a plurality of registration codes each representing a toy for sale.

A Virtual Environment Providing Subsystem 7 generates and/or provides the virtual environment data to be served by the server 3 to the users 10 for use in displaying a virtual environment on the users computers. Portions of this data may be generated on the fly in response to user interactions, and portions are likely to be obtained and/or derived from data stored in the Storage Subsystem 5. (For example, in the current embodiment, items owned by the user (the items in the dock for example), the virtual room state [virtual furniture in the room for example], virtual cash, health, happiness, hunger parameters are all examples of "stored data", whereas data generated on the fly include position in the room [which also gets stored], and Arcade Game scores, all of which are described in more detail below).

Again, the Subsystem 7 may utilize unique applications and/or hardware, or may be combined with one or more of the Registration Subsystem 6 and/or the Server Subsystem 2 applications and hardware.

Figure 2:
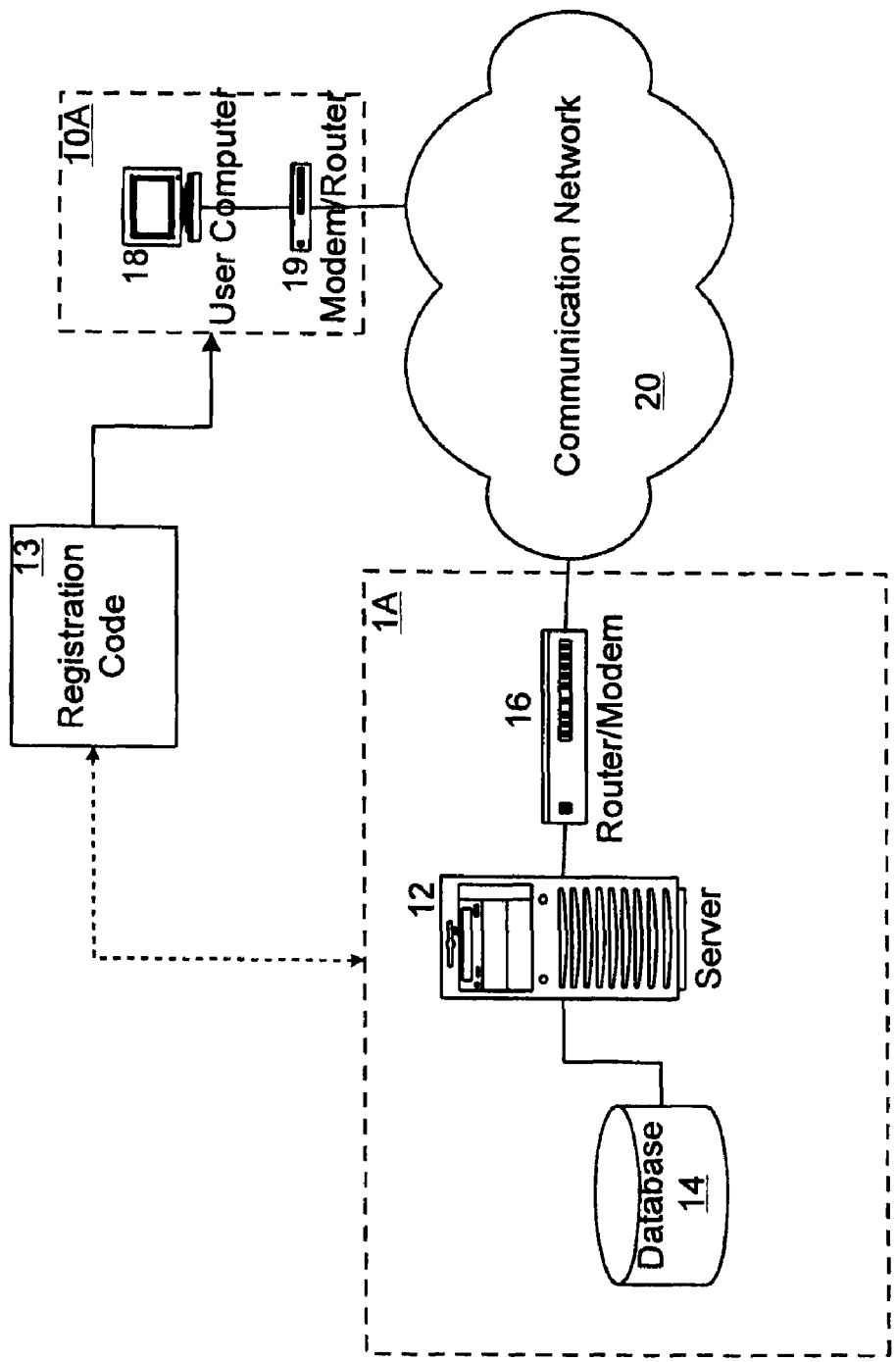
FIG. 2 shows a schematic diagram of a possible hardware implementation of an embodiment of the invention.

FIG. 2 shows an example implementation 1A of the Evaluation System 1, in one of its simplest forms. The system 1A comprises a server 12, a database 14, and a router/modem 16 to connect to a public communications network 20. A user 10A, utilizing a workstation 18, is also connected to the communications network via a router and/or modem 19, for example. In this implementation, the server 12, along with the database 14 and router/modem 16 and the appropriate software, implement all of the subsystem functions of the System 1 shown in FIG. 1 by executing various application programs on the server 12 hardware, for example. Of course, the system 1A may also support many additional users in a manner similar to that shown for user 10A, for example.

The current embodiment can utilize the Internet as the public communications network. However, other communications networks could be utilized, such as telephone networks, cellular networks, dedicated networks, cable TV networks, power lines, etc. Furthermore, combinations of these networks can be used for various functions. However, because of the ubiquitous nature of the Internet, a solution utilizing that diverse network (which can utilize many individual communications networks) is utilized in the current embodiment.

Furthermore, the System 1 might also utilize a private communication network for at least part of the system. For example, the Registration Subsystem 6 of FIG. 1 might be connected to a private computer network located at the retail store 8, where the user might register the toy, for example, as discussed in more detail below. Alternatively, the toy might automatically be registered at the time of purchase (e.g., by scanning a code at the register, for example), and thus not require any user interaction at all beyond purchasing the toy. Or the user might send in a registration card to implement registration, as another example.

Figure 3:
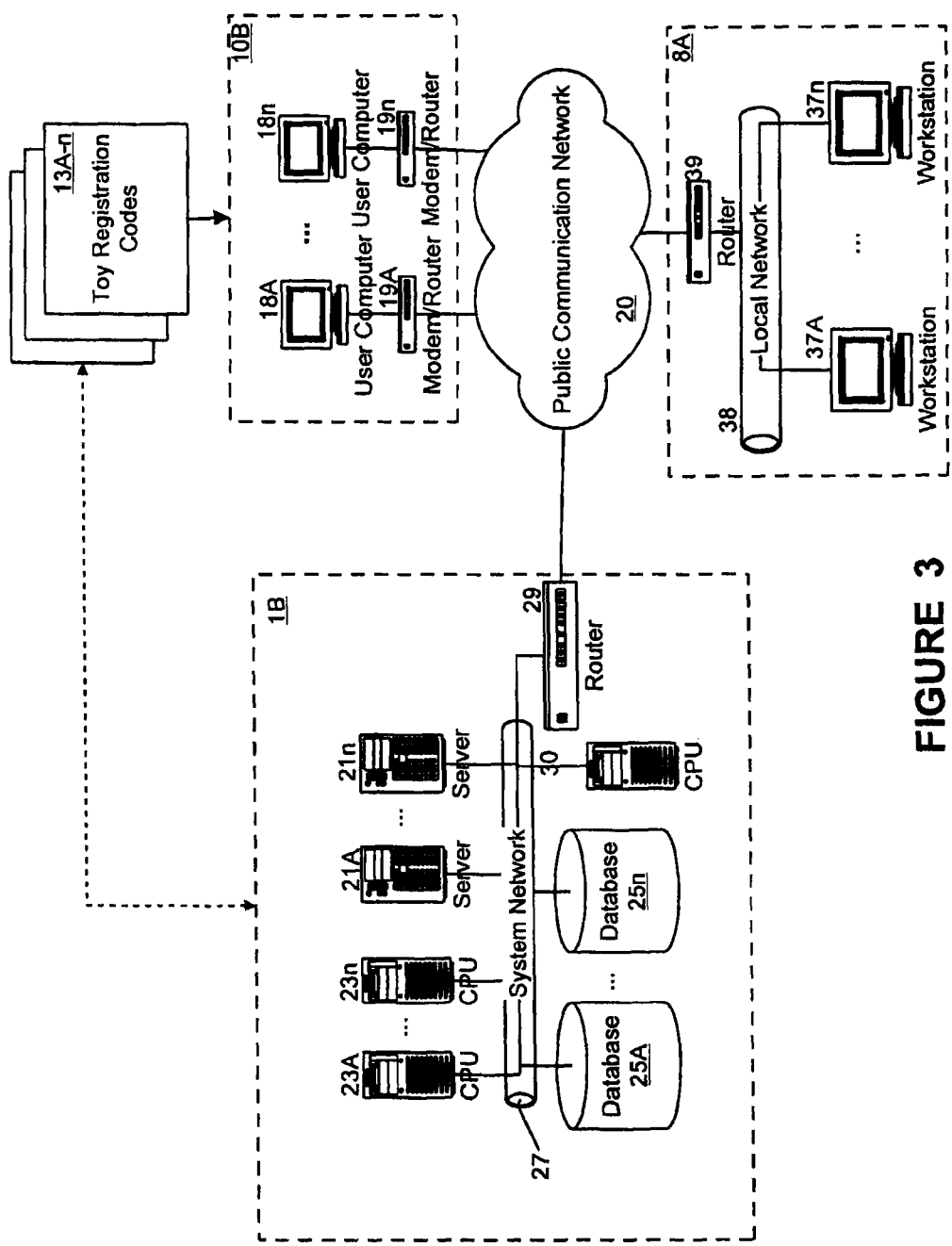
FIG. 3 shows a schematic diagram of a more complex hardware implementation of another embodiment of the invention.

FIG. 3 shows a more complex implementation 1B of the System 1. In this example system 1B, a plurality of servers 21A-21n can be utilized to implement the server subsystem 2 functions of FIG. 1. Furthermore, a plurality of CPUs 23A-23n can be utilized to implement the Virtual Environment Providing Subsystem 7 functions of FIG. 1. A plurality of database storage devices 25A-25n may be used to implement the Storage Subsystem 5 functions of FIG. 1. And a CPU 30 can be used to implement the Registration Subsystem 6 functions of FIG. 1, for example. A router 29 can be used to connect to the Public Communications Network 20.

Note that, although FIG. 3 shows multiple servers 21A-n, multiple CPUs 23A-n, and multiple databases 25A-n, any of these might be implemented on one or more shared computers in various configurations, executing one or more computer program applications, as desired. As the number of users supported by the system 1C grows, additional hardware can be added to increase the capacity of the system, as necessary, in a manner similar to that shown in the Figure.

Continuing with FIG. 3 showing the more complex implementation 1B, a plurality of users can be supported in various configurations. For example, a plurality of users 10B operating single workstations 18A-18n, individually connected to the public communications network 35, can be supported. Furthermore, complex user networks can also be supported. Retailers and/or Toy Manufacturers might also have access to the system, as represented by the example shown in 8A, should an online-ordering system be implemented for selling toys. Of course, alternate implementations are also possible, depending on the types and number of users and/or retailers being supported, and also depending on the state-of-the-art computer technology.

In the current embodiment, the System uses an Apache web server running in a Linux environment. For webserver hardware, an Intel 2 Ghz+ CPUs with 2 GB RAM running Gentoo linux with the appropriate extensions (e.g., mod_php4 and mod_perl) can be utilized. The server will serve flash content to a web browser running a web browser application using PHP, Perl, and actionscript, and flash plugins. A MySQL database application will also be utilized for the storage subsystem.

The client (user) side Flash application makes the calls to a number of PHP files. These PHP files then "interface" with the MySQL database to obtain the necessary data. All are served by the Apache web server, which can serve HTML, XML, along with the appropriate flash and other content. For multi-user environments (e.g., the multi user rooms discussed below) these are served by a socket server written in Perl.

This is effectively a 3 layer type of setup: Flash layer <--> PHP layer (this handles requests to the back end)<--> MySQL database, A dedicated database server running MySQL on a dedicated computer running the Gentoo linux OS can be used in the current system, A secure Apache SSL server can be utilized for the registration subsystem, likely sharing the computer with the other Apache server.

An Apache Secure Web server 240 can be used for serving files over secure connection (HTTPS, SSL mode), and an Apache Web server 250 can be used_for serving files over regular HTTP. A custom Socket Server 260, which is an XML socket server, written in PERL, is also utilized for providing independent environments for game sessions.

Items 242, 244, and 246 are parts of adoption center (discussed below), which is a flash application with PHP backend. Item 242 provides for user registration, using a form-driven flash application which validates the registration code and creates a user account within the system. A pet creation application 244, is a form driven flash application designed for guiding the user through pet creation process, and validating the registration code.

Authentication/Login process 246 is a flash application validating user credentials on the server side and spawning an API core in case of validation. It also has module designed for password retrieval based on collected user information, and currently passes user data to a client side API, and may in the future pass user data and a generated encryption key for a current session to a client side API.

Items 252 & 254 are Different media (files) available on the server subsystem for user use. Item 254 represents Flash Movies and Games available for the user. Item 256 represents the server side API. Chat 262 and Multi-user games interactions API (MAPI) 264 are a part of Client side API and are used for setting up and maintaining connection to the socket server, authenticating the user, and work in a pass-through mode for multi-user games/environment to exchange messages.

The API can be a functional layer, serving end user applications (Flash games and such) with stored data (users statistics, virtual toys' properties, item parameters, etc.) retrieved from the database; it also is used to modify/enter certain data.

The scheme of the API is subdivided into Client part 280 (flash application) and Server part 270 (PHP script). Flash clip/movie Game 290 calls a function within the API client side [Core 283] passing a request to some arbitrary data. The Client side API [Generator 285] sends the request to [Parser 272] server side API. The Server side [Core 273] processes it and retrieves data from the database, wraps it in XML [Generator 274] and sends it back to the Client Side API [Parser 282], which calls specified a callback function within originator Flash clip/movie [Game 290] and passes received data to it.

To ensure users privacy, prevent cheating and preserve validity/authenticity of information, additional security layers can be designed which encrypts all data being passed back and forth in-between parts of the APIs (client/server).

The chosen Encryption technique of the current embodiment is a modification of TEA routines, using a Feistel cypher with 128 bit key. Keys are generated at the login stage and securely passed to client side via HTTPS, after which the adoption centre spawns the client side API and passes the encryption data specific for the session. Additional measures which can be taken to prevent cheating and maintain data coherency include using different permutations of the original key for every data transmission.

Figure 4:
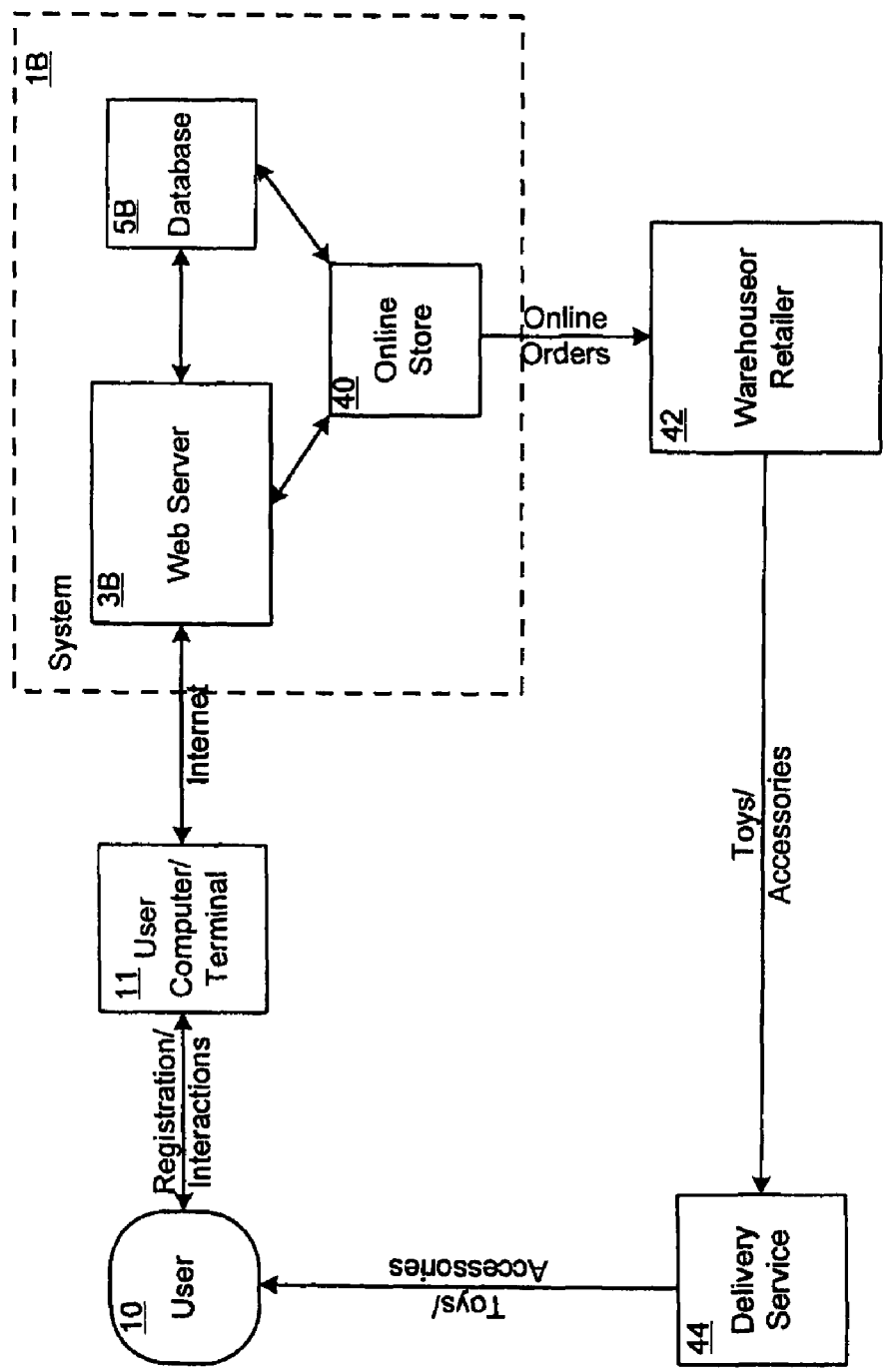
FIG. 4 shows a block diagram of another embodiment of the system and its interactions with some external entities.

FIG. 4 shows an alternate embodiment of the Entertainment System where the toys are sold to user via an online merchant. In this alternate embodiment, the Entertainment System 1B includes an online store 40 for a user 10 to purchase toys. The user 10 purchases the toys using the user computer 11, making an online payment using a credit card or online payment service, for example. A Warehouse or Retailer 42 then delivers the purchased toys, via a delivery service 44, for example, to the user 10. Registration of the toys could be automated, or as described above and below for a store-purchased toy.

One of the features of the Entertainment System in the current embodiment is to provide online User Games and Activities 110, which can be used to win more virtual cash 111. Some of these Games/Activities 110 are described in more detail below.

The collection of virtual cash 111 is for use in making "virtual purchases" of various "virtual commodities", for example. In the current embodiment, each registration of additional new toys adds an increasing amount of virtual cash, which is monitored and tracked by the System, the balance of which is shown to the user when the user is participating in the virtual environment. Virtual cash can be earned by playing games, successfully answering trivia questions, and via other means as well. According to alternate embodiments, virtual cash can be purchased by users via online sales. For example, users can pay for virtual cash using legal tender.

Furthermore, Virtual Cash 111 can be used to shop for one or more virtual rooms, virtual furnishings, accessories 114, virtual clothing, virtual food, and the like. These can be used to furnish one or more virtual rooms set up for the virtual character. Furthermore, by furnishing the virtual room(s) and adding virtual accessories, the well-being parameters 100 of the virtual character can be improved by the System, especially the happiness parameter 101 and the health parameter 103. Thus, a user can improve these parameters by using virtual cash to accessorize and outfit the various virtual rooms. The same can be said by purchasing virtual clothing for the virtual character, namely, that the health 103 and/or happiness 101 parameters can be affected by purchase, wearing, and/or changing of virtual clothing for the virtual replica.

In this manner, the Entertainment System uses the well-being parameters and virtual cash to help balance a platform for providing fun and activities, with an incentive to purchase new additional toys and accessories therefore, and to increase the user's attachment to the physical toy. The fun and enjoyment obtained through the use of the system provides free word-of-mouth advertising, which also helps sell additional physical toys. In this manner, the Entertainment System is a marketing tool that will increase the overall sales of the toys, and thus provide a benefit to retailers selling the toys.

Figure 6:
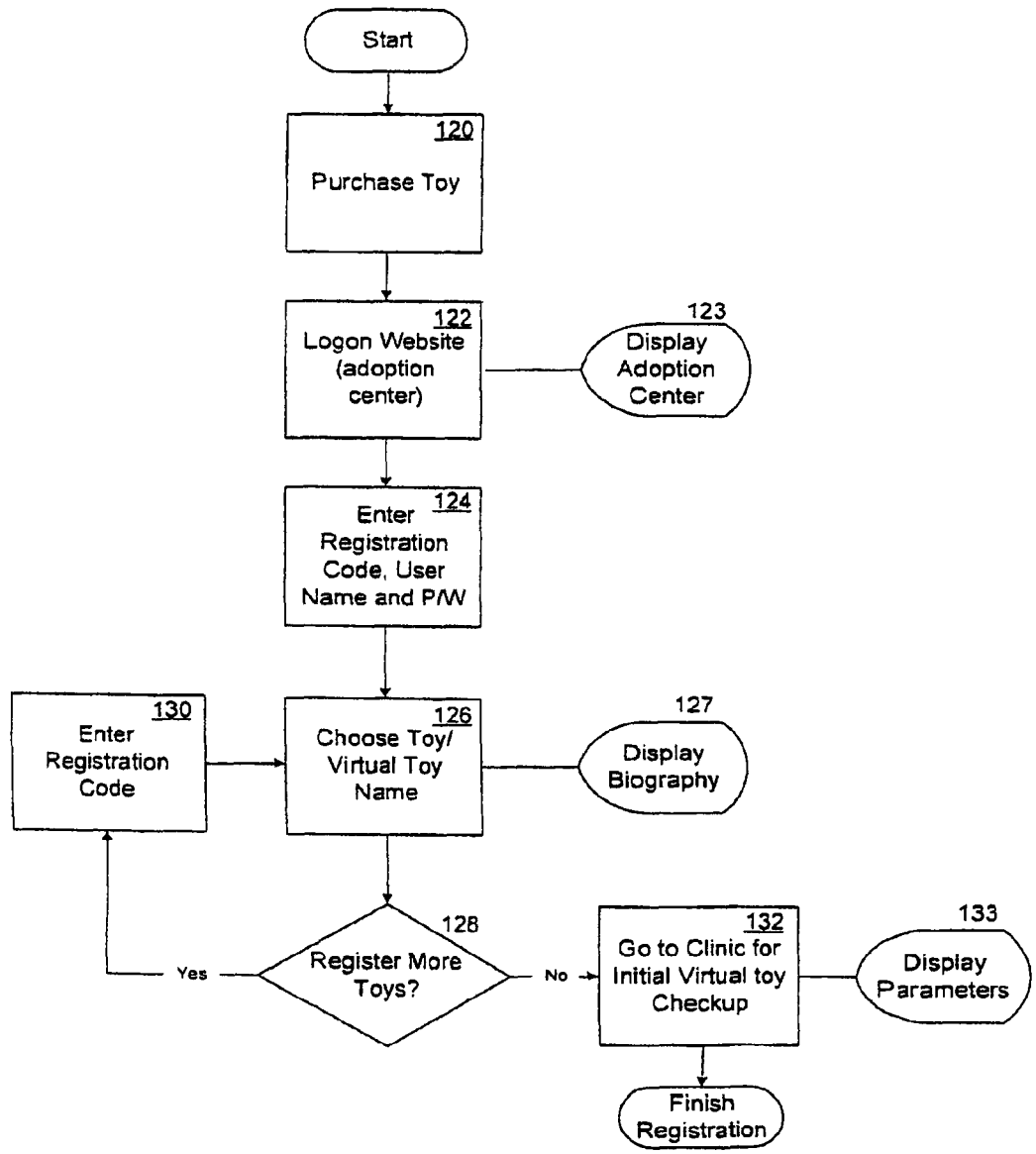
FIG. 6 shows a manner of a user registering with the System of the current embodiment for utilizing the System features.

FIG. 6 shows the preferred manner of a user registering with the System for utilizing the Entertainment System. The user typically makes a first purchase 120 from a retail store. However, in an alternate embodiment, online purchases might also be supported using an online store (as discussed above for FIG. 4), especially for subsequent purchases.

Figure 9:
FIG. 9 shows a sketch of an example toy according to the current embodiment.

The toys might be, for example, plush toy animals, robots, action figures, figures based on cartoon characters, vehicles, aliens, inanimate objects, other real-world items, etc. FIG. 9 shows an example sketch of a plush toy horse that might be purchased at a retail store and used for the Entertainment System.

Figure 10A:
FIGS. 10A and 10B show the front and back of a tag listing the System website address and a registration code according to the current embodiment.
Figure 10B:
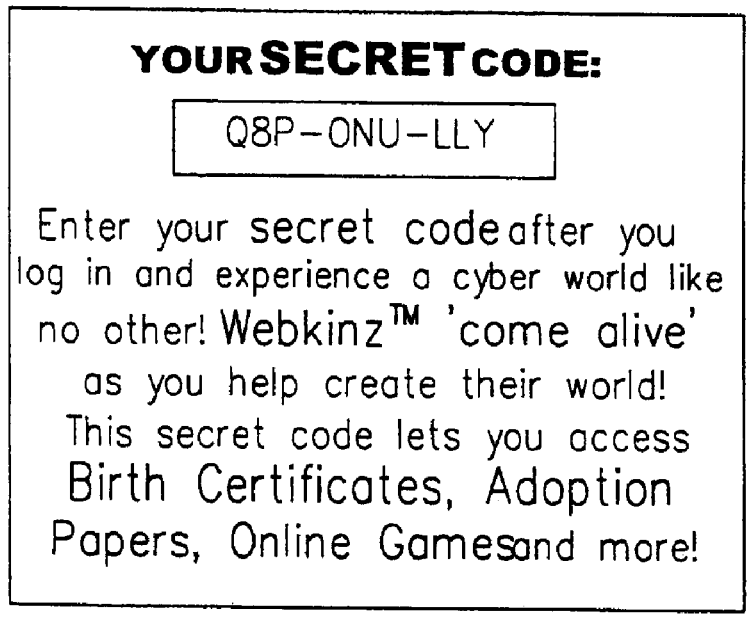

The toy will be paired with a hang tag or other device having the system website address and a registration code imprinted thereon or stored therein. For example, in the current embodiment, a simple paper or cardboard hang tag, as shown in FIGS. 10A (front) and 10B (back), has the website (FIG. 10A) and the registration code (FIG. 10B) imprinted on the tag.

Alternatively, an electronic storage device, such as a USB key, or wireless RF tag or Bluetooth device, could be embedded within or provided with the toy and/or its packaging at purchase. The electronic device would then have the registration code stored in the device using electronic memory (RAM, ROM, EEPROM, etc.), for example. As electronic storage devices become cheaper, using such a device for storing the registration code may become the preferred approach. According to alternate embodiments a registration code can be purchased by users online, and the registration code transmitted to the users in an email or other electronic transmission.

Figure 11A:
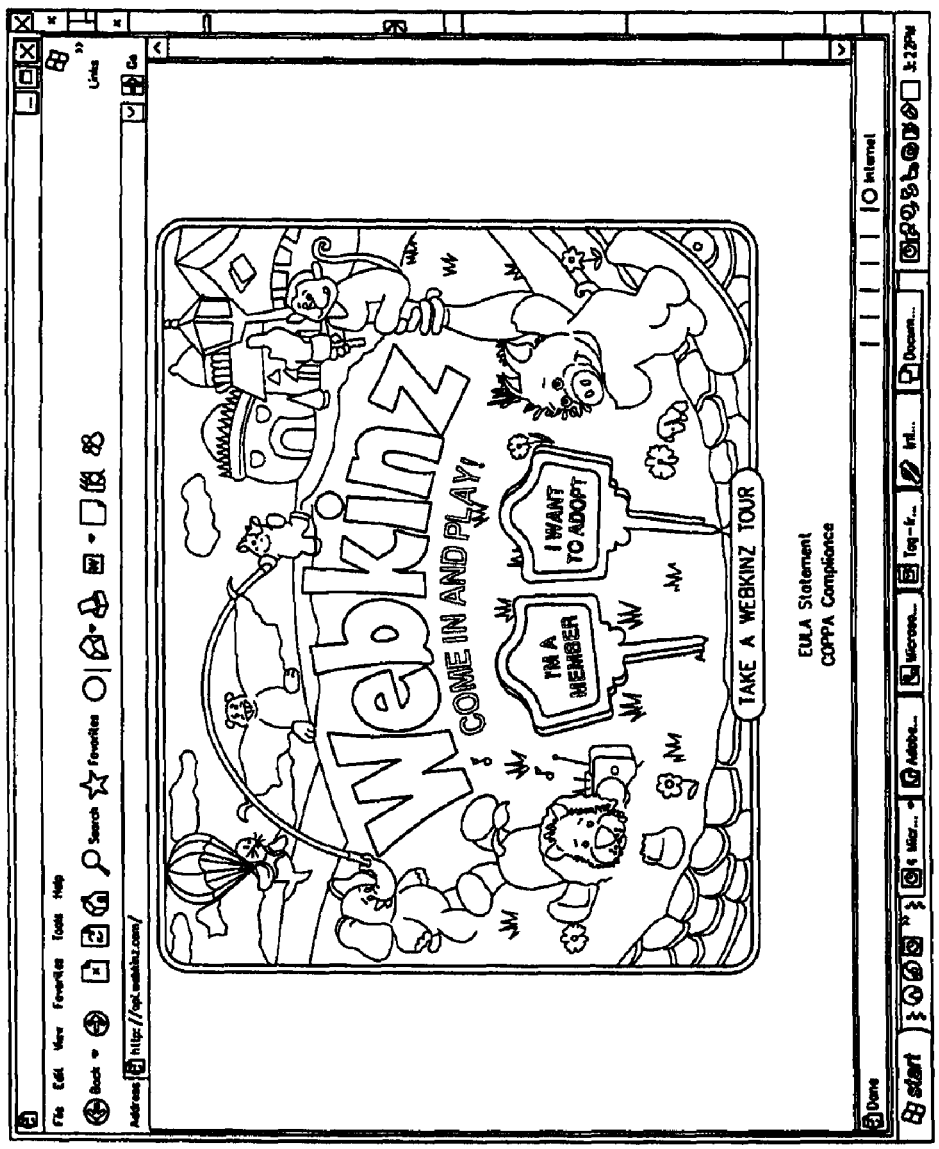
FIGS. 11A-11F show example screen shots of the website as possibly seen by a user of the system of the current embodiment.
Figure 11B:
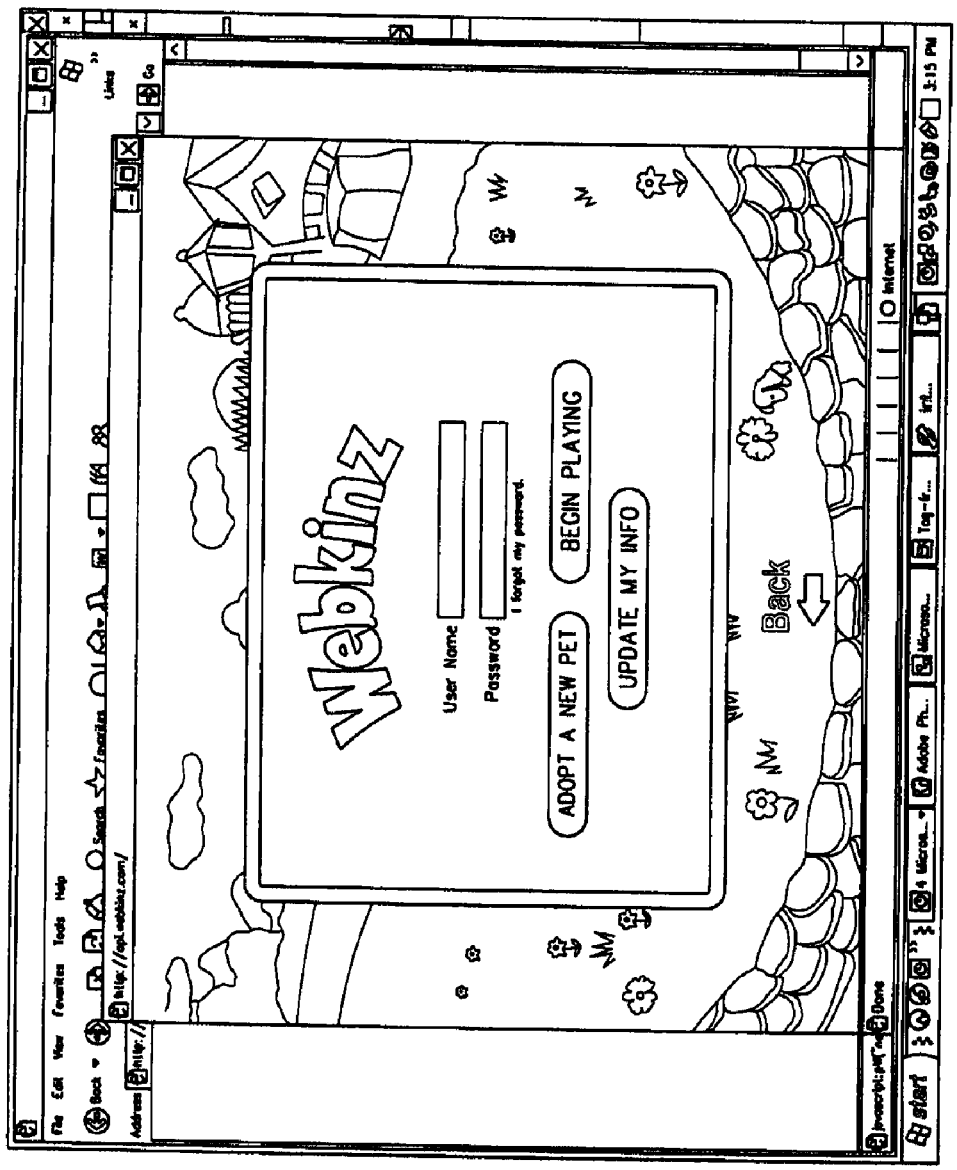

For the current embodiment, after the user takes the toy home, the user begins the registration process by visiting the Entertainment System website using the address on the tag and a user computer via an Internet connection to load the home page (see screen shot FIG. 11A) and logging on to the System website (see screen shot FIG. 11B) to load the adoption center 122. The System then displays an adoption center page (item 123 of FIG. 6), and example of which is shown in screen shot FIG. 11E.

In the current embodiment, the user then registers the toy, thus receiving access to the various online features of the invention, as discussed herein.

The registration process 124 of the current embodiment is performed by manually entering the registration code printed on the registration tag via the user computer connected to the Internet. The user also chooses a user ID and password. The System can ensure that at least the combination of ID and password is unique, or might also insure that each user ID is unique as well.

User-specific information that uniquely identifies each user might also be requested in order to recover user ID and password information. Such user-specific information might be a favorite color, user's birthdate, etc.

In an alternate embodiment using an electronic storage device with the registration code stored therein, the electronic device will communicate with the user computer via a corresponding device, and thus automatically or manually transfer the registration code to the user computer. For example, the System could request that the user plug in a USB key into the user computer at the appropriate time, or the user computer may wirelessly read an RF or Bluetooth device located in or on the toy.

In the current embodiment, after the user enters the registration code, and before or after the user enters the user ID and password, the System checks the registration code in any one of a number of ways. In essence, the system uses stored data relating to all of the registration codes associated with corresponding toys for sale.

The system might check the registration code against a list of valid registration codes stored in the system database, for example. In this case, the stored data are the actual registration codes themselves. If there is a match, the registration code has been validated, and the system then determines the type of toy that the user purchased based on information stored with the registration code in the database. For example, each code could be linked to information about the type of toy (e.g., a basset hound, a fish, a lion, a robot, a soldier, etc.), its coloration and appearance, its temperament, etc.

In such an embodiment discussed above, it would be beneficial to make each registration code unique and complicated, in order to make it difficult for an imposter or unauthorized user to make up a code or use a previously registered number to obtain unauthorized access or unauthorized additional virtual characters.

As an alternative, after being entered, the registration code is used in a mathematical algorithm to determine its authenticity, and such an algorithm might also be used to determine the type of toy being registered. For example, all lion plush toy registration codes might start with the letter "L", and might use a following number that can be factored into exactly 5 prime numbers, for example, or the number might fall into a particular range or format. Another example is the use of an algorithmic pass-code based on a central key value. In these examples, the stored data relating to the registration codes provides the proper information to perform the validation process (e.g., the proper letters, number ranges, acceptable factors, the central key, or the algorithm itself). Accordingly, by these methods, the actual registration numbers need not be stored, but could still be verified. Then, perhaps by storing the registered registration code, uniqueness could be guaranteed by never allowing that same code to be used again.

Of course, additional techniques can be used to determine a registration code authenticity as well, as long as the registration process ensures that it is likely the user has purchased a valid toy, and thus is an appropriate user of the system.

Referring again to FIG. 6, after validation and registration has occurred, and the user name and password is accepted, the user is prompted to provide a name for the virtual character 126 (or in an alternative embodiment, one is suggested by the site). The system can then display a biography of the virtual toy 127, and can also show the user what the appearance of the virtual toy will be. The biography may show such items as a virtual birth certificate, adoption certificate and/or information, likes and dislikes and favorite foods of the virtual toy, etc. The biography may be related to the personality/temperament of the virtual toy, the type of toy, etc. A virtual identity for the toy is thus created by the System, including the biographical information, the name provided by the user, etc.

The user might then be prompted to register any additional toys (128 & 130), if any. Finally, the System might provide the user with an initial virtual medical checkup 132 for the new virtual toy at a virtual clinic (see screen shot FIG. 11D for an example view of the clinic). The toy's wellness parameters can then be displayed to the user for the first time, and the registration process is thereby finished, and the user now has access to at least some of the restricted portions of the Entertainment System website.

Note that alternative means of registering the toy are also possible in alternative embodiments. For example, the user might phone in the registration code using a telephone, and be given a user ID and password, or choose one over the phone. Or the user may register the toy at the place of purchase using a dedicated or general purpose computer on a private network. Or, if the toy is purchased online, the registration might occur at the time of purchase, before the user has obtained the actual physical toy. Thus, different communication networks may be utilized for registration as are utilized for website access, for example.

In an alternative embodiment, the scenes might be customized based on the type of toy. For example, a basset hound plush animal could be shown in any virtual environment, such as an urban landscape or setting. Likewise, a cow could be shown in the countryside, a monkey in the jungle, and a lobster under the sea, as additional examples.

Furthermore, in another embodiment, each type of toy might have different traits that can impact the way the toy reacts based on the type of toy. Thus, a toy lion might be a mean carnivore, while a toy monkey eats fruit and is playful, for example. Soldiers might be aggressive, while dancers are graceful, for example. Thus, any of the above concepts are not limited to animal toys, but could easily support other toys such as human dolls, robots, machines, soldiers, etc.

Having virtually adopted their toy by registering it with the System, the user can then participate in a variety of online games, some involving the virtual representation of the toy (i.e., the virtual character). These games can include adventure games, trivia games, arcade-style games, and the like. Participants can collect "virtual cash", which is virtual money which can be spent to purchase virtual items such as virtual rooms for their toys, as discussed herein. This virtual cash may or may not be useable at other sites, and may or may not represent legal tender.

Furthermore, a participant may purchase additional toys, register them, adopt them, and thus add them their virtual environment, creating additional virtual characters. Creating another virtual character in such a manner can also grant the user access to a virtual room 500 representing the natural environment of the newly created virtual character. These purchases are preferred to be actual toy purchases using legal tender where the user obtains a real toy. However, in an alternative embodiment, "virtual characters" represented only online might also be utilized, whether purchased with legal tender or merely online "money", referred to herein as virtual cash.

Each of the new toys is, after registration, represented as a virtual character which can interact with other virtual characters (including those created to represent other actual toys) owned by the user or owned by other users, including team game play, for example. Participants can also chat with other registered users using online chatting or posting features. The current embodiment utilizes a symbol chat with preset icons, rather than general text chat, to protect children from inappropriate language. However, generalized chatting features could also be added, such as provided by a commercially available chat program, for example.

Figure 7:
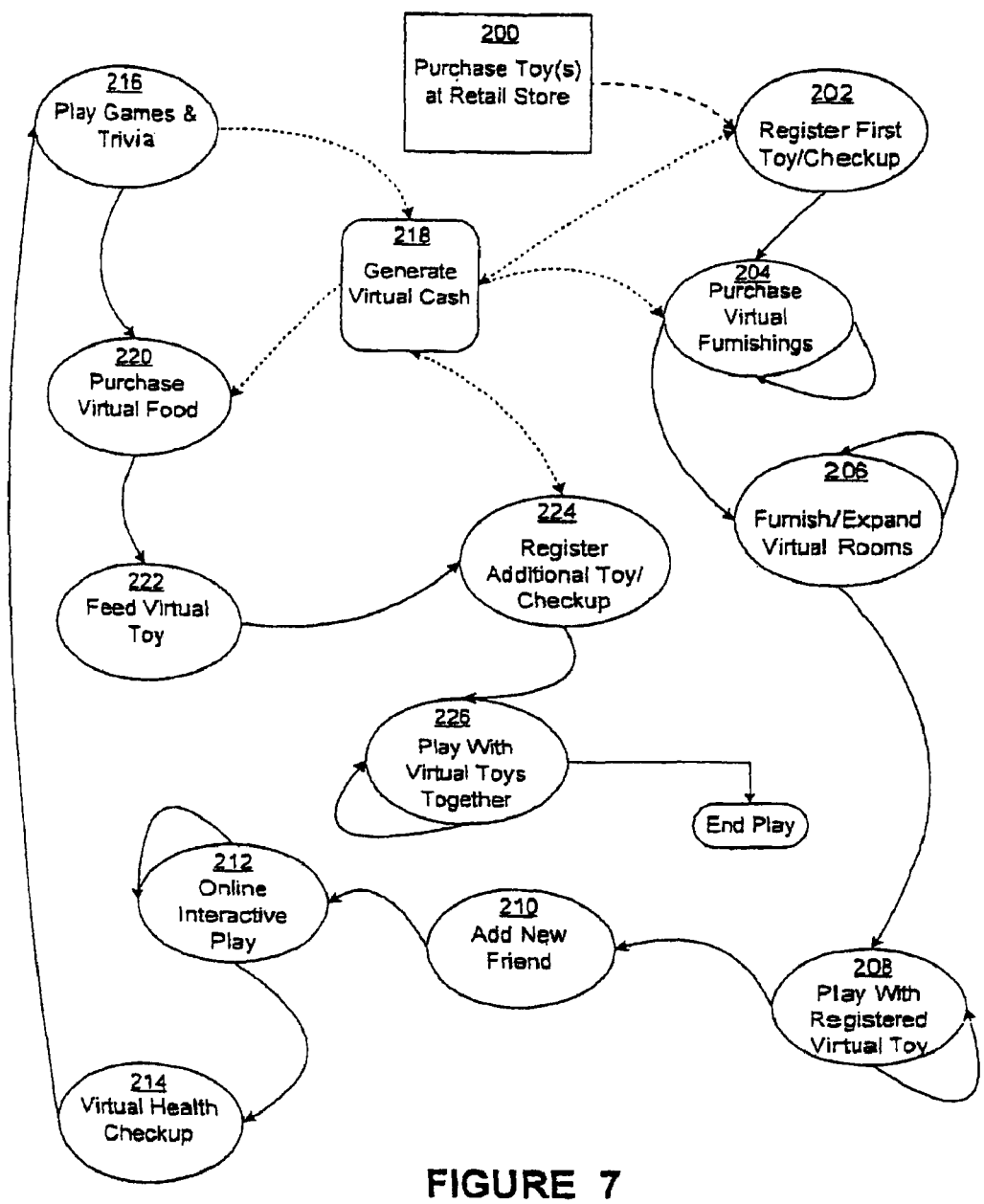
FIG. 7 shows an example of how a user might utilize the System of the current embodiment.

FIG. 7 shows an example of how a user might utilize the Entertainment System for a session or two. First, the user purchases one or more toys 200. Then, the user registers one of the toys 202, as described above. The user then purchases virtual furnishings and virtual accessories 204 for the virtual toy, and uses the purchased items to furnish the toy's virtual rooms 206. The user can virtually move the furnishings around the room by "point, click, & drag" operations, for example, thus testing various types of decorating schemes. The user can also paint/wallpaper the room, provide flooring, etc. all of which were purchased 204.

If the user bought additional toys, the additional toys 224 can be registered, which will also generate additional virtual cash 218. The user can then use both the original virtual character and the additional virtual character to play together, increasing the happiness parameter of both virtual toys, and perhaps making the toys hungry. The user then might end the online activities, or continue with additional online activities in a similar manner.

Figure 5:
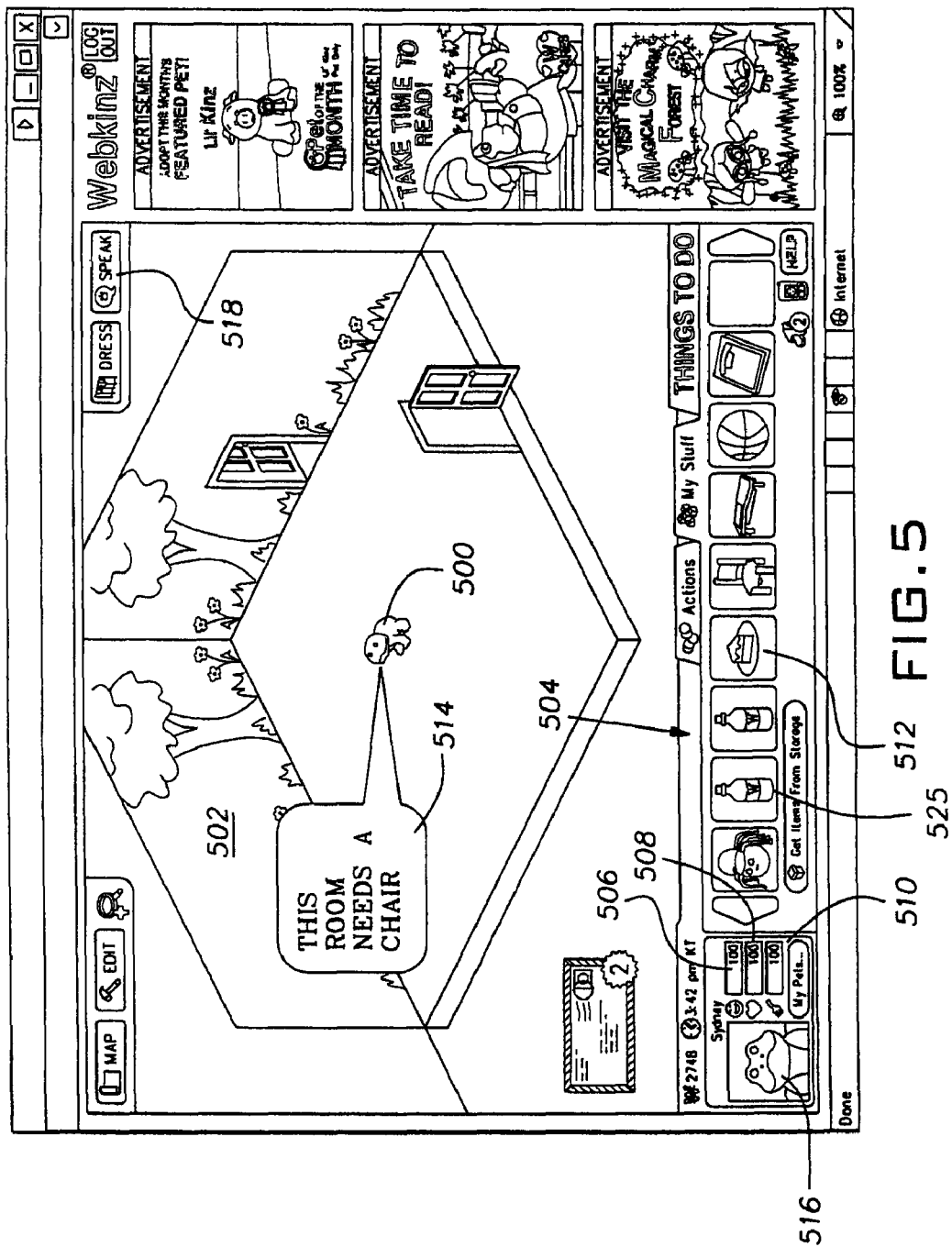
FIG. 5 shows a virtual room included as a portion of a virtual environment according to an aspect of the present invention.
Figure 11C:
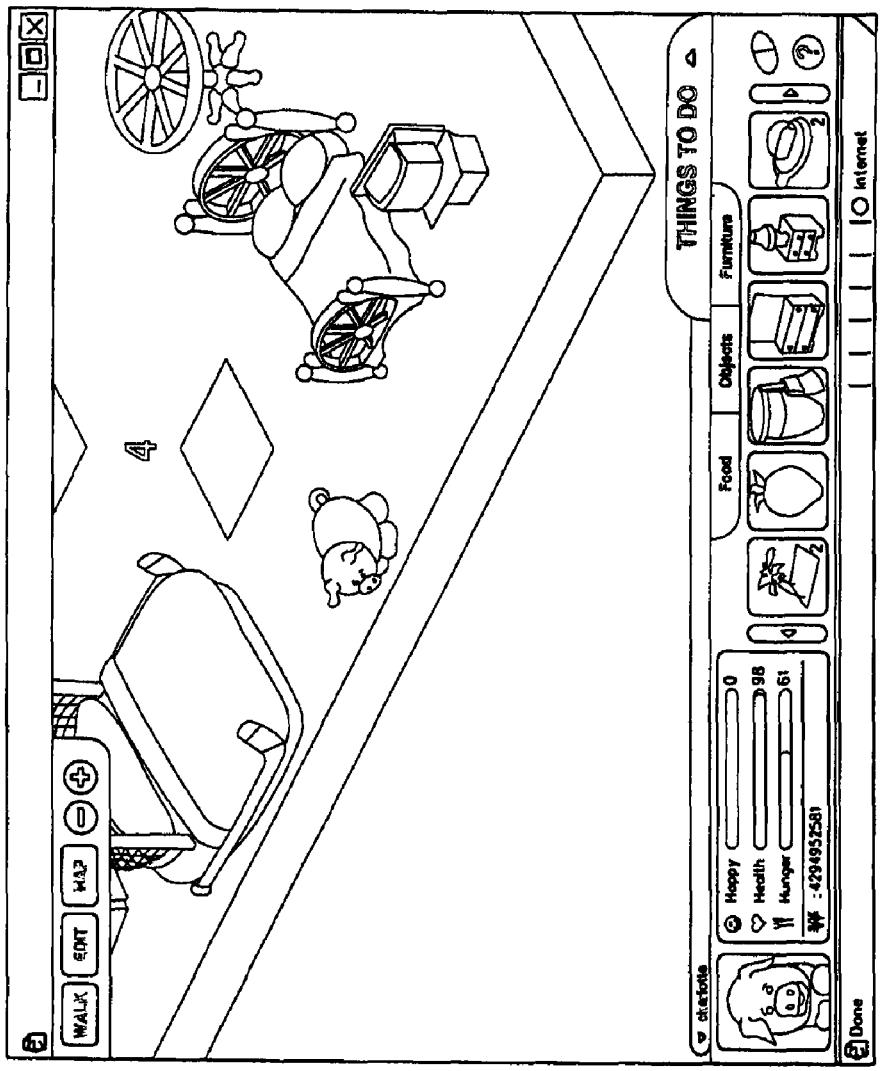
Figure 11D:
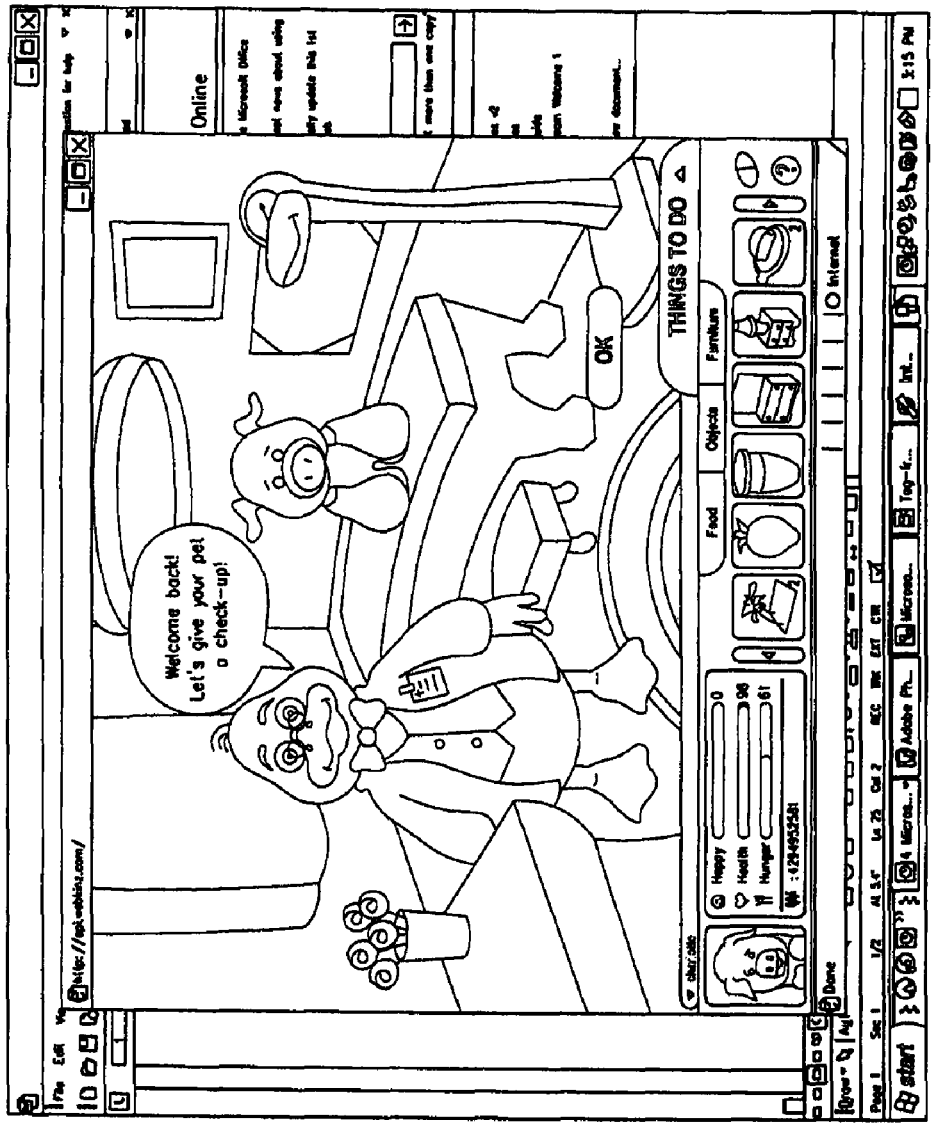
Figure 11E:
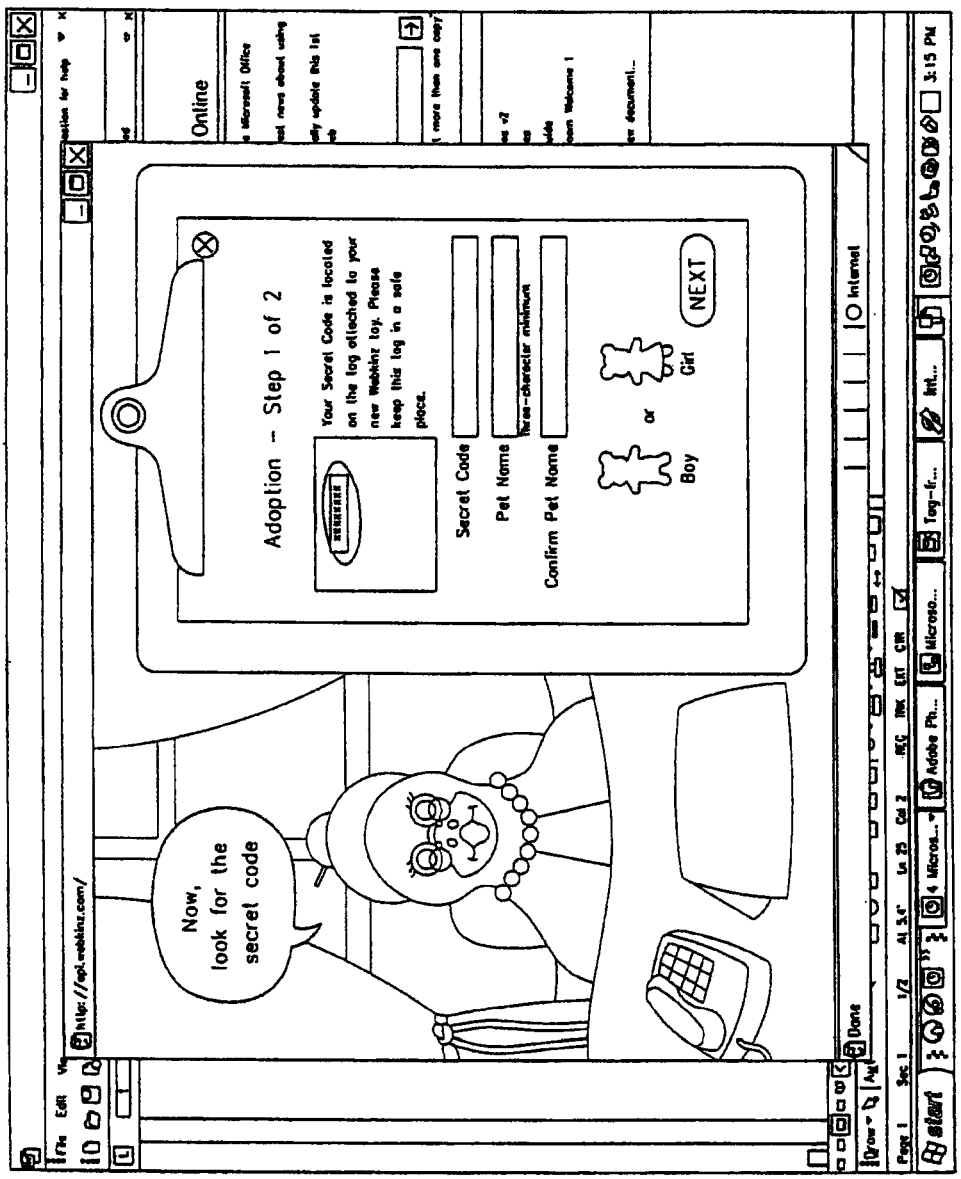

An example of a method of providing a virtual presentation facilitating communications 514 from a virtual character 500 to a user via a user computer 18 for entertaining the user will be introduced with reference to FIG. 5. In FIG. 5, the virtual character 500 is shown being displayed in a virtual room 502, which is the virtual environment of the current embodiment. The virtual room 502 can optionally be one of a plurality of virtual rooms that collectively form a virtual house. The user computer 18, server 3 or any other suitable computer hardware described above executing computer-readable instructions from a computer-readable medium can generate the virtual room 502 and display the virtual character 500 therein. As shown in FIG. 5, the virtual room 502 is empty, and does not include any virtual furniture 1100 (FIG. 11C). A furniture parameter associated with the virtual room 502 has a value that reflects the absence of virtual furniture 1100 from the virtual room 502. The value of the furniture parameter can be such that it influences the content of the communication 514, thereby generating content to be included in the communication 514 that reflects the value of the furniture parameter. A plurality of different parameters can be considered by the computer-executable instructions in generating the content of the communication 514, and the most significant parameter (i.e., the parameter having the highest, lowest, or any other extreme value) reflected in the content of the communication 514. In FIG. 5, since there is no virtual furniture in the virtual room 502, the communication 514 includes content that encourages the user to purchase a piece of virtual furniture 1100 for the virtual room 502. For the embodiment shown in FIG. 5 the communication includes content ("THIS ROOM NEEDS A CHAIR") that encourages the user to purchase a virtual chair, which can be purchased by the user in the virtual environment with virtual cash, legal tender, or any other desired form of payment.

The virtual character 500 in FIG. 5 is associated with at least one parameter that affects the content of any communications 514 from the virtual character 500 to the user. For example, the parameter(s) associated with the virtual character 500 can include at least one of a hunger parameter, a happiness parameter, a health parameter, a clothing parameter, a furniture parameter, an activity parameter and a neglect parameter. Other parameters can optionally be associated with virtual objects such as virtual furniture, virtual toys, virtual and clothing for example; as well as portions of the virtual environment such as an arcade game and a virtual room in the virtual environment for example. As used herein and in the claims, the phrase "at least one of followed by a plurality of members means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Some of the parameters have their value displayed in the virtual environment (i.e., on the "front end" of the entertainment system), while other parameters do not have their value displayed (i.e., exist on the "back end" of the entertainment system). For example, in FIG. 5 a value is displayed in the "dock" 504 for each of the happiness parameter 506, the health parameter 508 and the hunger parameter 510 associated with the virtual character 500. According to the current embodiment, each of these parameters 506, 508, 510 can achieve a value of any integer on a scale ranging from zero (worst value) to 100 (best value), but other measures of these parameters 506, 508, 510 are also within the scope of the claimed invention. Further, different relative values of the parameters 506, 508, 510 can also be utilized to measure a virtual condition of the virtual character 500.

For example, each parameter 506, 508, 510 is indicative of its corresponding condition. For example, the virtual character 500 having a hunger parameter value of 25 is considered to be hungrier than when the virtual character's hunger parameter value is at 100. Virtually feeding the virtual character 500 an item of virtual food 512 such as the cake shown in the dock 504 in FIG. 5 would increase the value of the hunger parameter 510, unless of course the value is already at its maximum value, in which case the virtual character 500 can optionally deny the offering of virtual food 512, and/or issue a communication 514 including content such as a polite refusal or warning about overfeeding the virtual character 500, for example. Issuing communications from the virtual character 500 is described in greater detail below. Virtually feeding the virtual character 500 virtual food 512 can be accomplished in the virtual environment 502 by dragging the virtual food 512 from the dock 504 to the virtual character 500, by dragging the virtual food 512 from the dock 504 to an image 516 of the virtual character 500, by clicking on the virtual food 512, by selecting an appropriate menu item, and in any other suitable manner.

Other parameters and their values are optionally not displayed to the user in the virtual environment 502, and can optionally be associated with the virtual environment or a virtual object such as a piece of furniture 1100 within the virtual environment in addition to, or in lieu of the virtual character 500. But even though they are not displayed, they can be included in the execution of a method according to the computer-readable instructions stored on the computer-readable medium in generating a communication 514 from the virtual character 500. For example, the virtual room 502 shown in FIG. 5 forming a portion of the virtual environment lacks any virtual furnishings 1100, such as a chair, couch, bed, television, etc. . . . , such as those shown in FIG. 11C. When the virtual character 500 enters the virtual room 502 when instructed to do so under the control of the user, a furniture parameter associated with the virtual environment can be cleared, or set to zero indicating the lack of furniture in the virtual room 502, for example. Any suitable values can be assigned to the furniture parameter to allow the entertainment system to generate a communication 514 including content related to the virtual furniture 1100 (or lack thereof) from the virtual character 500 to the user with the user computer 18.

Examples of such content related to the virtual furniture 1100 from the virtual character 500 can include, but is not limited to: the lack of a predetermined number of virtual furnishings 1100, a suggestion to add a piece of virtual furniture 1100 in the possession of the virtual character 500 to the virtual room 502, a suggestion to purchase a piece of virtual furniture 1100 with actual and/or virtual cash 111, and any other content relating to the virtual furniture 1100. According to other embodiments, the furniture parameter can optionally indicate a theme pervasive throughout the virtual room 502 and the content can recommend virtual furniture consistent with that theme.

Another parameter associated with the virtual character 500 that is optionally not displayed in the virtual room 502 is the clothing parameter associated with the virtual character 500. Although not displayed in the virtual room 502, the clothing parameter can be actively utilized by the system and method to control interactions between the virtual character 500 and the user. The value of the clothing parameter, which can also be cleared or set to zero, or a numerical or other value, can indicate whether the virtual character 500 is wearing any virtual clothing, and optionally the virtual clothing being worn, if any.

The communication 514 from the virtual character 500 can include content related to the value of the clothing parameter when the clothing parameter is evaluated as explained below, or when the communication 514 is generated. For example, the content can include a request to replace the article of virtual clothing currently being worn by the virtual character 500 with another article of virtual clothing, a complement on the article of virtual clothing currently being worn by the virtual character, a request that a new article of virtual clothing be purchased for the virtual character with virtual and/or real cash, a request that the article of virtual clothing in the possession of the virtual character but not currently being worn be placed on the virtual character, and any other suitable content relating to the value of the clothing parameter. The content can also be a request from the virtual character 500 that the user input a command to carry out any one or more of the above requests.

The activity parameter is another of the parameters not displayed in the virtual room 502 of FIG. 5. The activity parameter can be evaluated, optionally in response to a user-initiated request asking the virtual character 500 if the virtual character 500 would like to participate in an activity. The content included in the communication 514 from the virtual character 500 can be related to the value of the activity parameter, and specifically include a desired activity in which the virtual character 500 would like to participate. For example, the content can optionally include a statement such as: the name of a particular activity and/or game, a category of activity and/or game, and the like.

According to alternate embodiments, a separate activity parameter can be specifically associated with one or more of an activity, game, trivia contest, other contests and the like to influence communications 514 from the virtual character to the user. For example, the activity parameter for a first game that the user plays frequently will be higher than the activity parameter specific to a game that the user has not yet played, or plays less frequently than the user plays the first game. Alternate embodiments of the activity parameter indicate an order in which the user has participated in activities, games, trivia questions, contests and the like. For example, if the user has participated in a first activity more recently than a second activity, the activity parameter specific to the first activity will be higher than the activity parameter specific to the second activity. The higher the activity parameter the less likely it will be that the communication 514 from the virtual character to the user will suggest participating in the respective activity.

As the virtual environment is updated to include new activities, trivia contests/questions, games and the like that the user can participate in, the activity parameter specific to the newly updated material can optionally be set to a default value that makes it likely that the communication 514 will suggest participating in such newly updated content. For example, for a new game added to the arcade, the default activity parameter associated with the new game can be set to a default zero value. Such a low value of the activity parameter makes it likely that the communication 514 from the virtual character 500 to the user will suggest participation in the new game. In this manner, content added to the website can be brought to the attention of the user by the virtual character 500, making it unlikely that the user will overlook the newly available content.

As mentioned elsewhere herein, portions of the virtual environment are restricted, and can only be accessed upon the performance of qualifying actions by the user, the virtual character, or both. For instance, if a user has registered a plush toy land-dwelling animal such as a cat, the user is granted access to at least one virtual land-based room in which the virtual character representing the cat can walk, play and interact with other virtual characters and virtual items in the room(s). If the user purchases a real-world plush toy fish, for example, which naturally lives in an aquatic environment then the user is granted access to a virtual aquatic room upon registering the registration and subsequent validation of the registration code associated with the plush toy fish. Accordingly, the present method and system can optionally evaluate another parameter indicative of the real-life items registered by the user, the portions of the virtual environment to which the user has been granted access, the portions of the virtual environment to which the user is denied access, or any combination thereof to generate content of a communication 514. This content of the communication 514 can suggest that the user purchase a real-world item to gain access to a restricted portion of the virtual environment; purchase a virtual environment item to gain access to a restricted portion of the virtual environment; purchase, using either or both legal tender and virtual cash, access to a restricted portion of the virtual environment, or any combination thereof.

The neglect parameter, also not shown in the virtual room 502 of FIG. 5, relates to a length of time since the virtual character 500 was last controlled by the user, and the content of the communication 514 from the virtual character 500 includes a statement related to the length of time. For example, such content can be based on the length of time since the user last accessed the virtual environment or since the user last controlled the virtual character 500. The neglect parameter according to alternate embodiments can optionally be indicative of a length of time since the user performed one or more activities such as play an arcade game, answer a trivia question, etc. . . . on the website. The neglect parameter can be specific to a particular activity, and/or a function of how frequently the user participates in any activity.

The health parameter 508 and the happiness parameter 506 are both shown in the virtual environment of FIG. 5. They relate the overall health and happiness of the virtual character 500, respectively. The health parameter 508 can be evaluated to assess the physical well being of the virtual character 500, while the happiness parameter 506 can be evaluated to assess the mood of the virtual character 500. Various activities can affect the value of the health and happiness parameters 508, 506, such as shopping for the virtual character 500, having the virtual character 500 visit a physician, nurse or other health professional, and the like. Just as before, based on a value of the health and/or happiness parameters 508, 506 the virtual character 500 can issue the communication including content related to the status of the virtual character 500 as determined from the evaluation of the health and/or happiness parameters 508, 506. Examples of content related to the health and/or happiness parameters 508, 506 include, but are not limited to, a statement regarding the health of the virtual character 500, information regarding a particular ailment being suffered by the virtual character 500, a recommended treatment of a condition of the virtual character 500, a mood of the virtual character 500, a desire of the virtual character 500, an activity that the virtual character 500 can participate in to affect the health and/or happiness parameters 508, 506, and the like.

Figure 8:
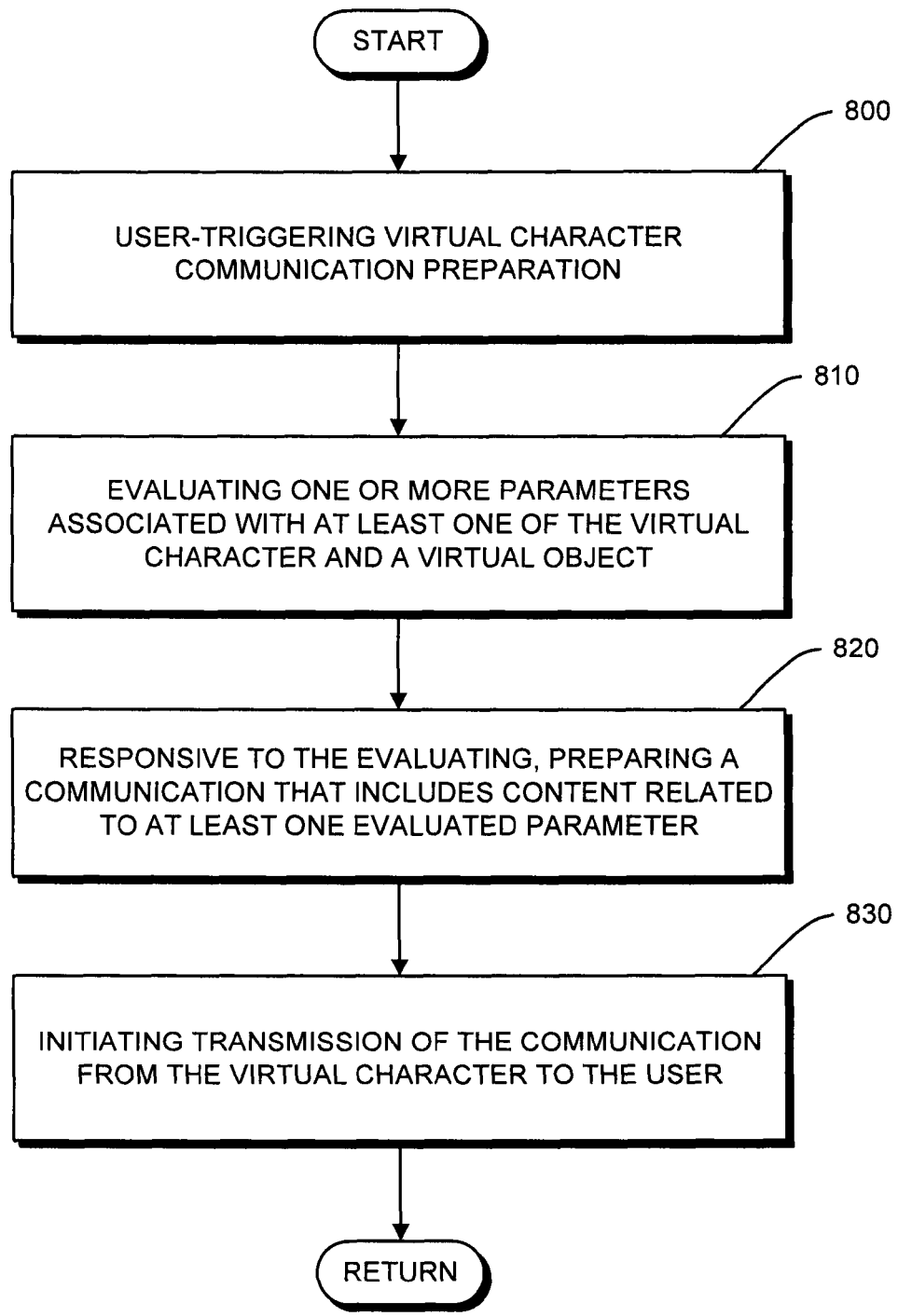
FIG. 8 shows a flow diagram illustrating a method according to an embodiment of the present invention.

FIG. 8 is a flow diagram illustrating an illustrative embodiment of a method that can evaluate one or more of the above parameters to issue a communication 514 from the virtual character 500 to the user via the user computer 18. The exemplary method of FIG. 8 will consider evaluation of the hunger parameter 510 to enable the virtual character 500 to issue a communication 514 including content relating to the hunger parameter 510, food 512, or similar subject. If the user would like to determine what virtual food 512, if any, the virtual character 500 would like to eat, the user can input a command to interact with the virtual character 500. For example, the user can actuate the "Speak to Virtual Character" button 520 displayed by the user computer 18, which is represented by step 800 in FIG. 8. The user's manual actuation of the "Speak to Virtual Character" button 520 triggers the process of the virtual character's interaction, also referred to as communication, with the user. This is an example of a "user-triggered" communication 514 by the virtual character 500.

In response to the triggering event at step 800, the method progresses to the evaluation of a value of the at least one parameter associated with at least one of a virtual object in the virtual environment and the virtual character 500 at step 810, which, in the current embodiment is the hunger parameter 510. Examples of the virtual object (in addition to the virtual furniture 1100 mentioned above) include, but are not limited to: a virtual outdoor object such as a virtual swimming pool, virtual lawn chair, virtual trampoline, virtual football or other type of virtual sporting equipment; virtual clothing; a virtual toy for the virtual character; and the like. The virtual object can be anything displayed in the virtual environment along with the virtual character 500.

Evaluation of the hunger parameter 510 can lead to a determination whether the virtual character 500 is hungry, and to what extent. Responsive to the evaluation, a communication 514 is prepared to be issued from the virtual character 500 to be transmitted to the user via the user computer 18 at step 820. Preparation of the communication includes selecting content related to the at least one parameter evaluated that will be transmitted to the user. Preparation of the communication at step 820 depends on the parameter(s) evaluated, as the content will relate to the parameter(s), and is best understood with reference to the flow diagram of FIG. 12.

Figure 12:
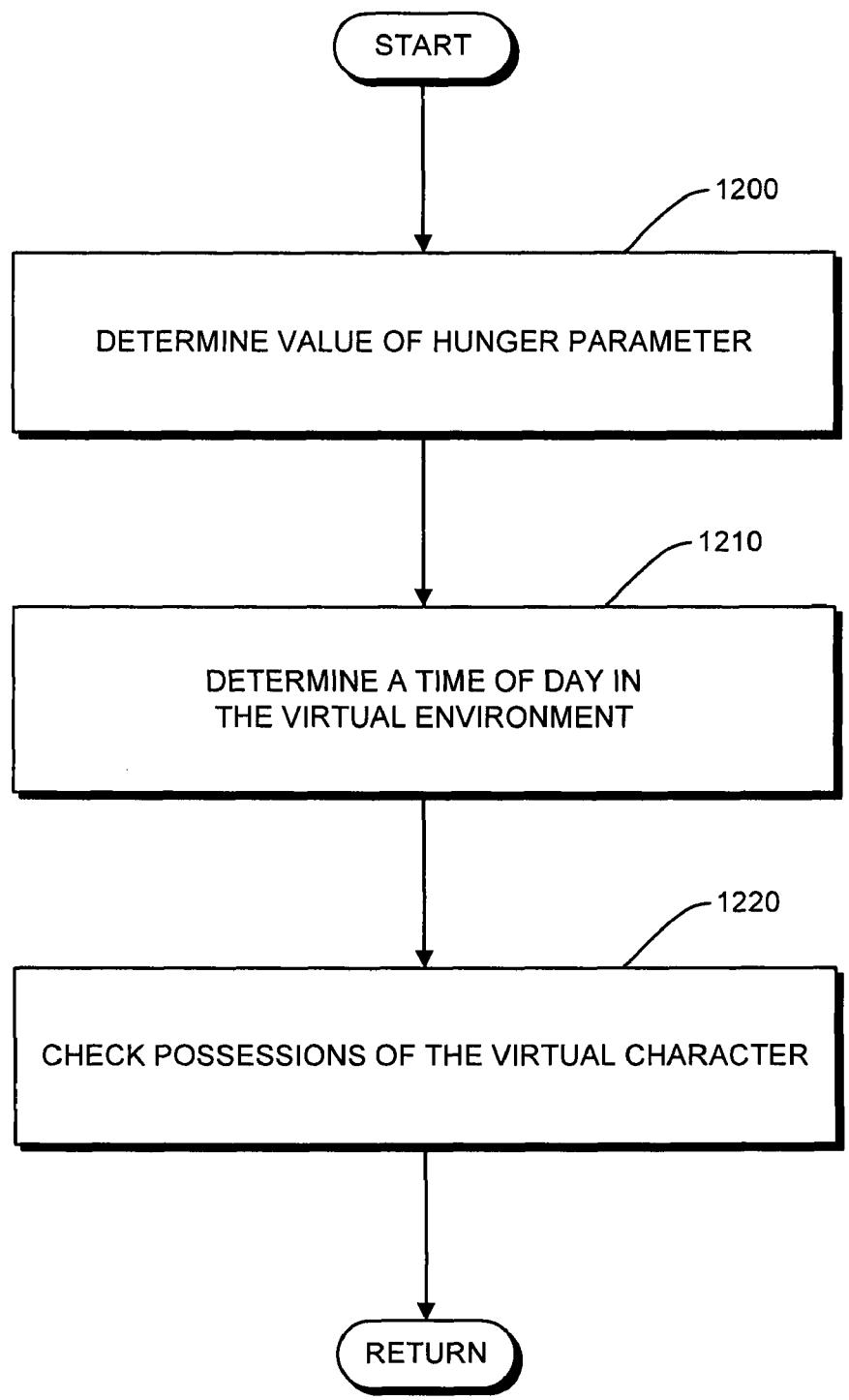
FIG. 12 shows a flow diagram illustrating a method of preparing a communication including content related to a hunger parameter according to an aspect of the present invention.

According to the method in FIG. 12, the content of the communication 514 related to the hunger parameter is selected based on at least one of: the time of day for the virtual character 500 in the virtual environment, the hunger level of the virtual character 500; and any food items 512 possessed by the virtual character 500. At step 1200 the hunger parameter 510 is evaluated by the entertainment system to determine the extent of the virtual character's hunger. The hunger level of the virtual character can optionally be broken down into categories, with each category corresponding to a range of hunger parameter values. More "filling" virtual food items 512 are favored over less filling virtual food items to satisfy a greater hunger, as indicated by the value of the hunger parameter 510. How "filling" a virtual food item 512 is provides an indication of the extent to which that virtual food item 512 will affect the value of the hunger parameter 510 when fed to the virtual character 500. An example of the category breakdown is shown below in Table 1.

TABLE 1

| Hunger Parameter Value | Extent of Hunger |
|---|---|
| 100 | No Hunger |
| 90+ | Mild Hunger |
| 80-89 | Average Hunger |
| 70-79 | Hungry |
| 69 and below | Extreme Hunger |

From Table 1, it can be seen that the lower the value of the hunger parameter 510, the greater the hunger experienced by the virtual character 500. Food items 512 in the virtual environment include food items 512 that are commonly available, or can regularly be purchased in the virtual environment, as well as special, limited edition food items. The limited edition food items include "Cookbook" food and "Secret" food, which are only requested in the content of the communication 514 under limited circumstances. For example, the likelihood that a Cookbook food and/or a Secret food are requested by the virtual character 500 increases as the value of the hunger parameter 510 decreases. Cookbook and Secret food items affect the value of the hunger parameter 510 to a greater extent than commonly available food items 512, with Secret food items affecting the value of the hunger parameter 510 more than the Cookbook food items. An illustrative, non-limiting table outlining the likelihood that Cookbook and Secret food items will be request is shown below in Table 2.

TABLE 2

| Value of Hunger Parameter | Likelihood a Cookbook Food Will Be Requested | Likelihood a Secret Food Will Be Requested |
|---|---|---|
| 100 | 0% | 0% |
| 90+ | 0% | 0% |
| 80-89 | 1% | 0.5% |
| 70-79 | 2% | 1% |
| 69 and under | 5% | 2% |

Referring once again to FIG. 12, the time of day in the virtual environment is assessed at step 1210. For some embodiments, the time of day in the virtual environment will coincide with the time of day in the real world, depending on the time zone in which the user is located. But for other embodiments, the time of day in the virtual world may not coincide with the time of day in the real world. The category from which the food item will be requested as part of the content of the communication 514 from the virtual character 500 depends at least in part on the time of day in the virtual environment. For example, in the early morning hours the content of the communication 514 is more likely to request a breakfast food item rather than a dinner food item. An example of the breakdown of food categories based on the time of day in the virtual environment is shown below in Table 3, but other such arrangements are within the scope of the claimed invention.

TABLE 3

| Food Category | Time |
|---|---|
| Breakfast | 6:00 AM until 9:59 AM |
| Snack | 12:00 AM until 5:59 AM |
| | 10:00 AM until 11:59 AM |
| | 10:00 PM until 11:59 PM |
| Lunch | 12:00 Noon until 1:59 PM |
| Sweet | 2:00 PM until 4:59 PM |
| Dinner | 5:00 PM until 7:59 PM |
| Dessert | 8:00 PM until 9:59 PM |

As the value of a virtual character's hunger parameter 510 falls the likelihood that a Secret or a Cookbook food will be requested as part of the content of the communication 514 increases. These probabilities can optionally supersede other factors in selecting the content to be included in the communication 514, so, for example, a Cookbook food item and/or a Secret food item may be requested regardless of the time of day in the virtual environment as described below. The appropriate class in which the value of the hunger parameter 510 falls can optionally be observed, however. Therefore, considering an example where the value of the virtual character's hunger parameter 510 is 80 (out of a possible 100), there is a 98.5% probability that a commonly available food item 512 will be requested in the content of the communication 514, a 1% probability that a Cookbook food item will be requested and a 0.5% probability that a Secret food item will be requested.

The "Dock" 504 or other organizer in which the virtual character's possessions are arranged is searched to determine whether a food item 512 falling in the appropriate food category for the time of day and suitable for the value of the hunger parameter 510 is among the virtual character's possessions at step 1220. If so, this food item 512 will be favored to be included in the content related to the hunger parameter 510 in the communication 514 from the virtual replica 500 to the user. If not, any food item(s) otherwise satisfying the criteria can be randomly selected from the appropriate criteria to be requested by the virtual character 500 as part of the content of the communication 514. Thus, the request in the content can optionally also include a request that the randomly selected virtual food item be purchased for the virtual replica 500 to eat.

Referring to the virtual environment shown in FIG. 5, consider an example where it is 3:00 PM in the virtual environment, the virtual character 500 has a hunger parameter value of 75, and the user has a Cake virtual food item 512 and a Water virtual food item 525 in the Dock 504. The "Food Category" is determined to be "Sweet" according to Table 3, due to the time of day, and the value of the hunger parameter 510 is determined to correspond to "Hungry" according to Table 1. Since the Cake virtual food item 512 satisfies all the criteria, the content of the communication 514 from the virtual character 500 will include a request for the Cake virtual food item 512 from the dock 504, unless a superseding request for a Cookbook food item or Secret food item is selected.

The example of preparing the communication described above is an example of a user-triggered communication 514 from the virtual replica 500. However, alternate embodiments of the communication 514 can be triggered based on the value of one or more of the parameters automatically, without user intervention and without first requiring a user-input command, such as the actuation of the "Speak to Virtual Character" button 520. These embodiments are referred to as parameter-triggered communications 514. According to yet other embodiments, the communication 514 can simply be randomly triggered upon the occurrence of an event in the virtual environment, such as when the virtual character 500 enters a new room or other portion of the virtual environment, following a predetermined period of inactivity, when a predetermined piece of virtual furniture is placed in the virtual environment, when the virtual character 500 enters a predetermined portion of the virtual environment, and the like. The communication 514 can also optionally include different content each time it presented to the user via the user computer. Thus, the communication 514 can include different content at a first time than when presented a second time, but each time the content of the communication 514 relates to the condition of at least one of the virtual object, the virtual environment and the virtual character. As described elsewhere herein, this condition to which the content is related can optionally be determined according to the value of a parameter related to that condition, such as the clothing parameter, activity parameter, furniture parameter, hunger parameter, neglect parameter, and the like.

Figure 13:
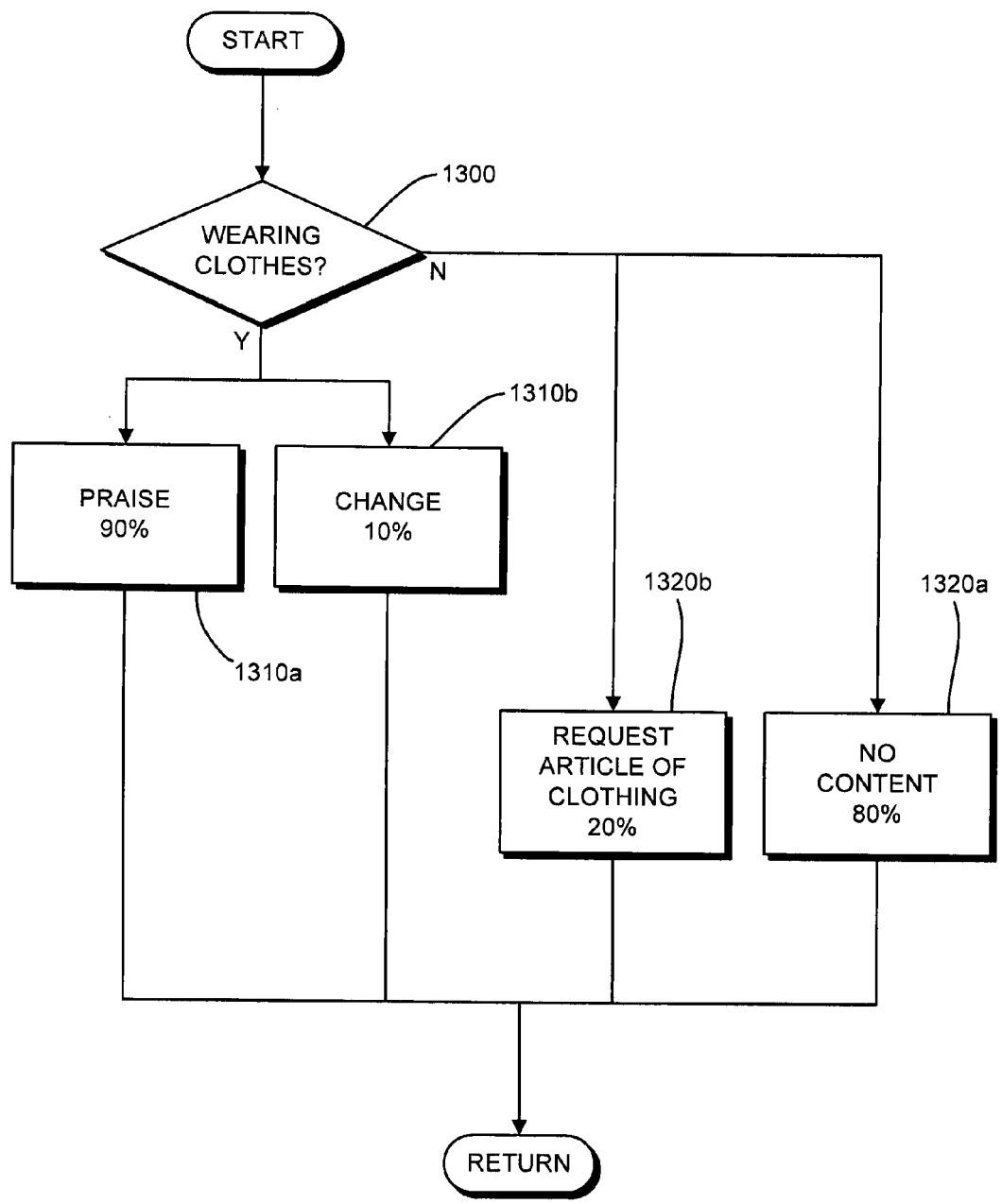
FIG. 13 shows a flow diagram illustrating a method of preparing a communication including content related to a clothing parameter according to an aspect of the present invention.

The step of preparing the communication 514 to include content related to the clothing parameter can best be understood with reference to the flow diagram of FIG. 13. As shown, it is determined whether the virtual character 500 is wearing at least one article of virtual clothing at step 1300. If so, 90% of the time for the embodiment shown in FIG. 13 a complement about the clothing being worn by the virtual character 500 will be selected for inclusion in the content at step 1310a. The other 10% of the time a request from the virtual character 500 to add, remove, or otherwise change at least one article of virtual clothing currently being worn by the virtual character 500 will be selected at step 1310b. The change of virtual clothing can optionally require the purchase of a new piece of virtual clothing for the virtual character 500 with virtual and/or real cash. Of course the 90/10 split of probabilities can be adjusted to other ratios as desired without departing from the scope of the present invention.

If, at step 1300 it was determined that the virtual character 500 was not wearing any virtual clothing, it is most likely (80% probability in the embodiment of FIG. 13) that there will be no content related to the clothing parameter selected for the communication 514 at step 1320*a*, and thus the communication 514 will not be transmitted to the user. Alternatively (with a probability of about 20% according to the embodiment shown in FIG. 13), the request for clothing will be selected as the content of the communication 514 at step 1320*b*. Just as before, the ratio of probabilities can be varied as desired without departing from the scope of the present invention.

When a request for a change in virtual clothing is selected for inclusion in the content of the communication 514, that request can be retained in a memory until the user logs out of the virtual environment. When the user then changes the virtual character's clothing, the virtual character 500 will receive a predetermined increment (such as +2, for example) to the happiness parameter 506. Similarly, if the virtual character 500 is not wearing any virtual clothing and a request for virtual clothing is selected for inclusion in the content of the communication 514, this can also optionally be saved in a memory. The value of the virtual character's happiness parameter 506 will also receive a predetermined incremental increase (such as +2, for example) when the user issues the command via the user computer 18 to provide the virtual character 500 with the requested virtual clothing. In either instance, the request retained in the memory In addition to any increase in the value of the happiness parameter 506, a random communication 514 including appreciative or praise content can optionally also be transmitted from the virtual character 500 when a request for clothing is fulfilled by the user.

As with the communication 514 regarding hunger discussed above, the example of preparing the communication including content related to clothing can suitably be a user-triggered communication 514, can be triggered based on the value of one or more of the parameters without first requiring a user-input command, such as the actuation of the "Speak to Virtual Character" button 520, and can be randomly triggered upon the occurrence of an event in the virtual environment, such as when the virtual character 500 enters a new room or other portion of the virtual environment, following a predetermined period of inactivity, when a predetermined piece of virtual furniture is placed in the virtual environment, when the virtual character 500 enters a predetermined portion of the virtual environment, and the like.

Communications 514 from the virtual character 500 regarding virtual furniture can include content that is divided into two categories: (1) a communication transmitted in response to purchased virtual furnishing; and (2) a random room communication. The first category, a communication 514 in response to a purchased virtual furnishing can best be understood with reference to FIG. 14.

Figure 11F:
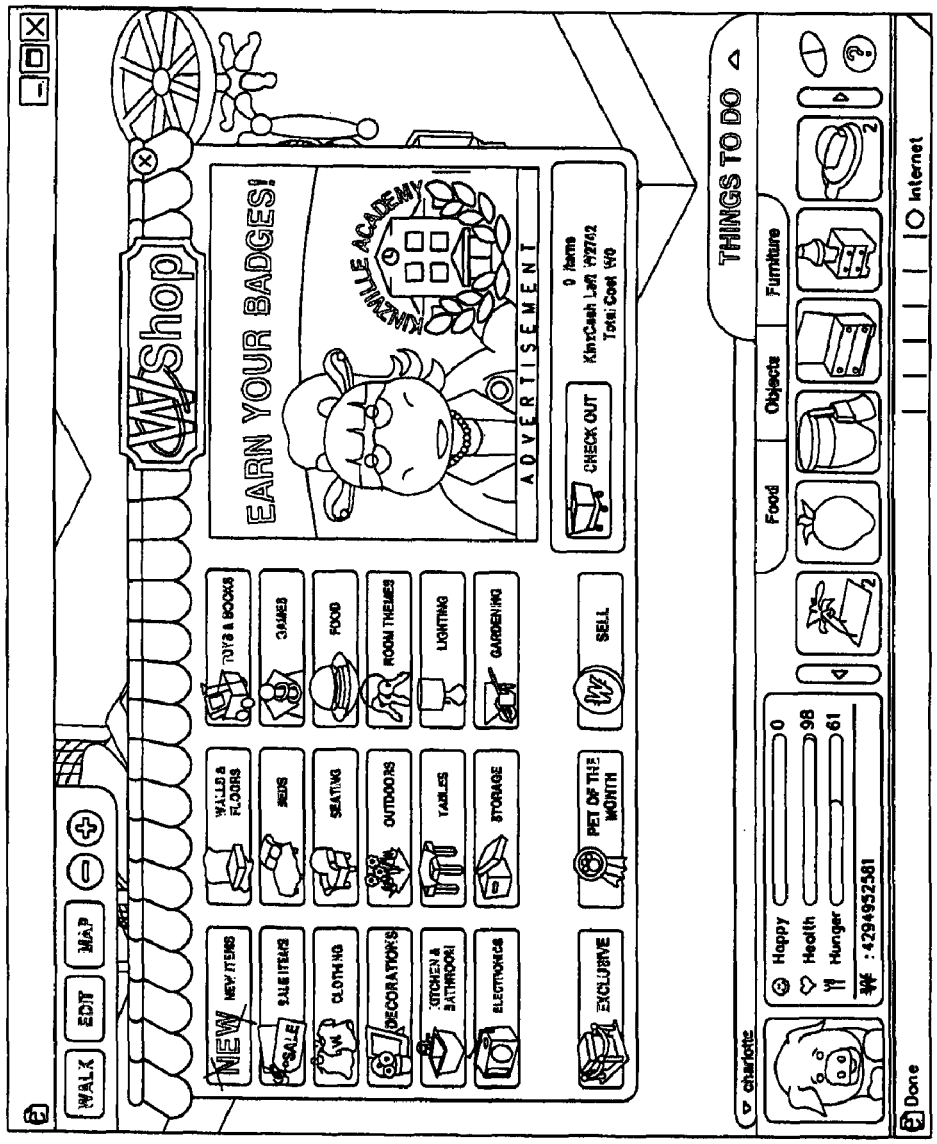
Figure 14:
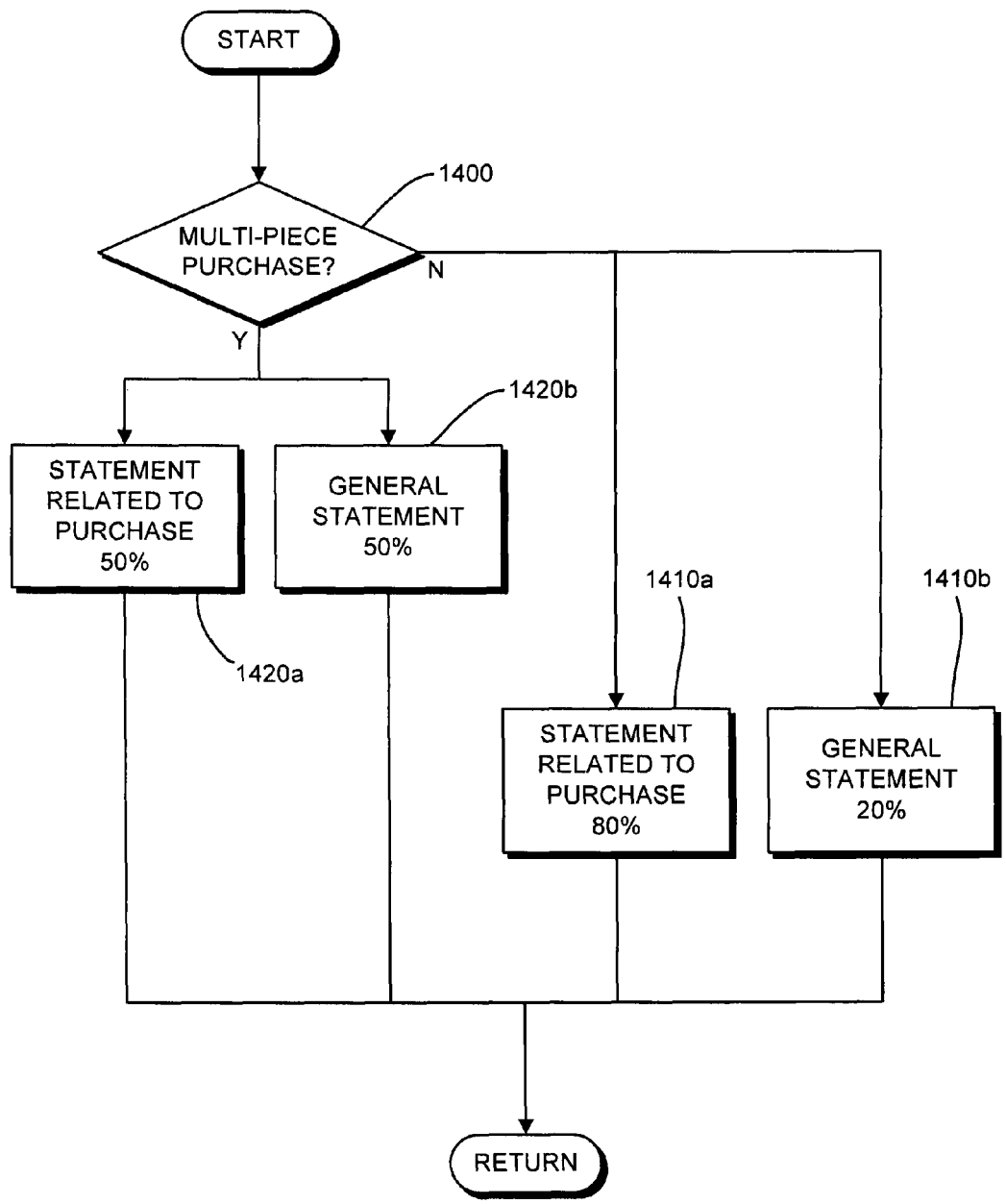
FIG. 14 shows a flow diagram illustrating a method of preparing a communication including content related to a furniture parameter according to an aspect of the present invention.

When making purchases at a virtual shopping location in the virtual environment, such as that shown in FIG. 11F, it is determined at step 1400 in FIG. 14 whether one piece of virtual furniture 1100 was purchased, or more than one piece of virtual furniture 1100 was purchased. If a single piece of virtual furniture 1100 was purchased, a statement relating to the particular piece of virtual furniture 1100 purchased is most likely to be selected at step 1410*a* as the content related to the furniture parameter for inclusion in the communication 514. Otherwise, a general statement relating to shopping at the virtual shopping location will be selected at step 1410*b* as the content related to the furniture parameter for inclusion in the communication 514. The ratio of probabilities for the embodiment in FIG. 14 is 80/20 in favor of selection of a comment relating to the particular piece of virtual furniture 1100 purchased, but this ratio can be adjusted as desired without departing from the scope of the present invention.

If, however, it is determined at step 1400 that multiple pieces of virtual furniture 1100 are purchased, then it is equally probably that either a statement relating to one of the particular pieces of virtual furniture 1100 purchased will be selected at step 1420*a*, or a general statement relating to purchasing new virtual furniture 1100 will be selected at step 1420*b* to be included in the content related to the furniture parameter of the communication 514. The equal probability ratio for selecting the content related to the furniture parameter can again be adjusted as desired without departing from the scope of the present invention.

According to the second category of furniture content, the communication 514 can be a random room communication that includes content selected in response to the presence of one or more pieces of virtual furniture in a portion of the virtual environment. Such a communication 514 can be transmitted automatically and without a prior user instruction for such a communication 514 when the virtual character 500 enters the portion of the virtual environment where the virtual furniture 1100 is present.

Figure 15:
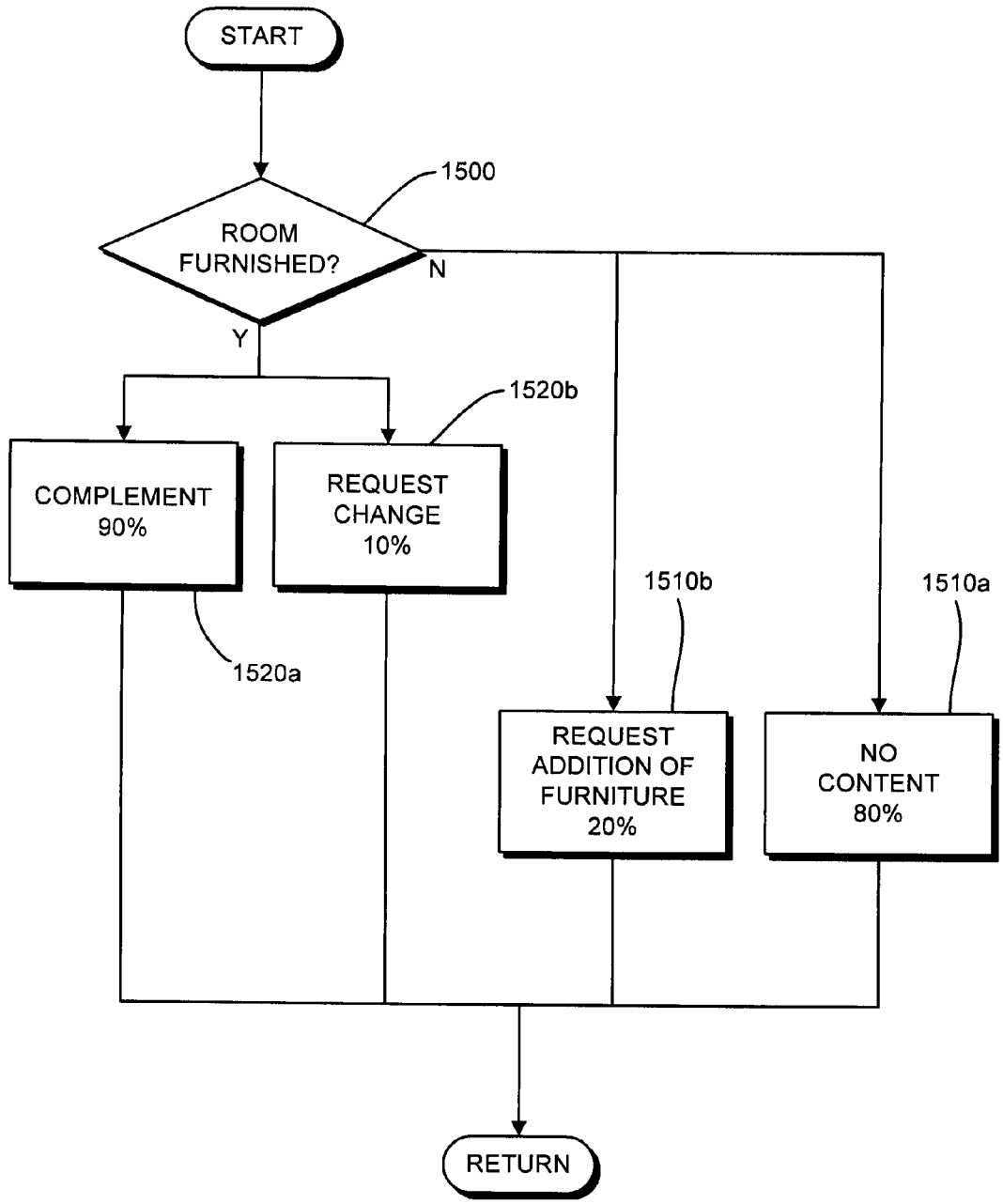
FIG. 15 shows a flow diagram illustrating a method of preparing a communication including content related to a furniture parameter according to an aspect of the present invention.

With reference to FIG. 15, it is determined at step 1500 whether a virtual room 502 or other portion of the virtual environment lacks virtual furniture as shown in FIG. 5, or includes virtual furniture 1100 as shown in FIG. 11C. If virtual furniture 1100 is not present, it will likely be decided at step 1510*a* that no content related to the furniture parameter will be included in the communication 514, and thus, the communication 514 will not be transmitted from the virtual character 500 under such circumstances. Otherwise, a statement, comment or request for the addition of a piece of virtual furniture 1100 to the virtual room 502 or other portion of the virtual environment will be selected as the content of the communication from the virtual character 500 to the user at step 1510*b*. The relative probabilities of selecting the respective content related to the furniture parameter can be adjusted as desired without departing from the scope of the present invention.

If, at step 1500 it is determined that the virtual room 502 or other portion of the virtual environment in which the virtual character 500 is located is furnished with at least one piece of virtual furniture 1100, then a praise response or complement is favored to be selected at step 1520*a* as the content of the communication 514 related to the furniture parameter. A request for a change to the virtual furniture 1100 in the virtual room 502 is less favored to be selected at step 1520*b* as the content of the communication 514 related to the furniture parameter. The relative probabilities of selecting the respective content related to the furniture parameter can be adjusted as desired without departing from the scope of the present invention.

Figure 16:
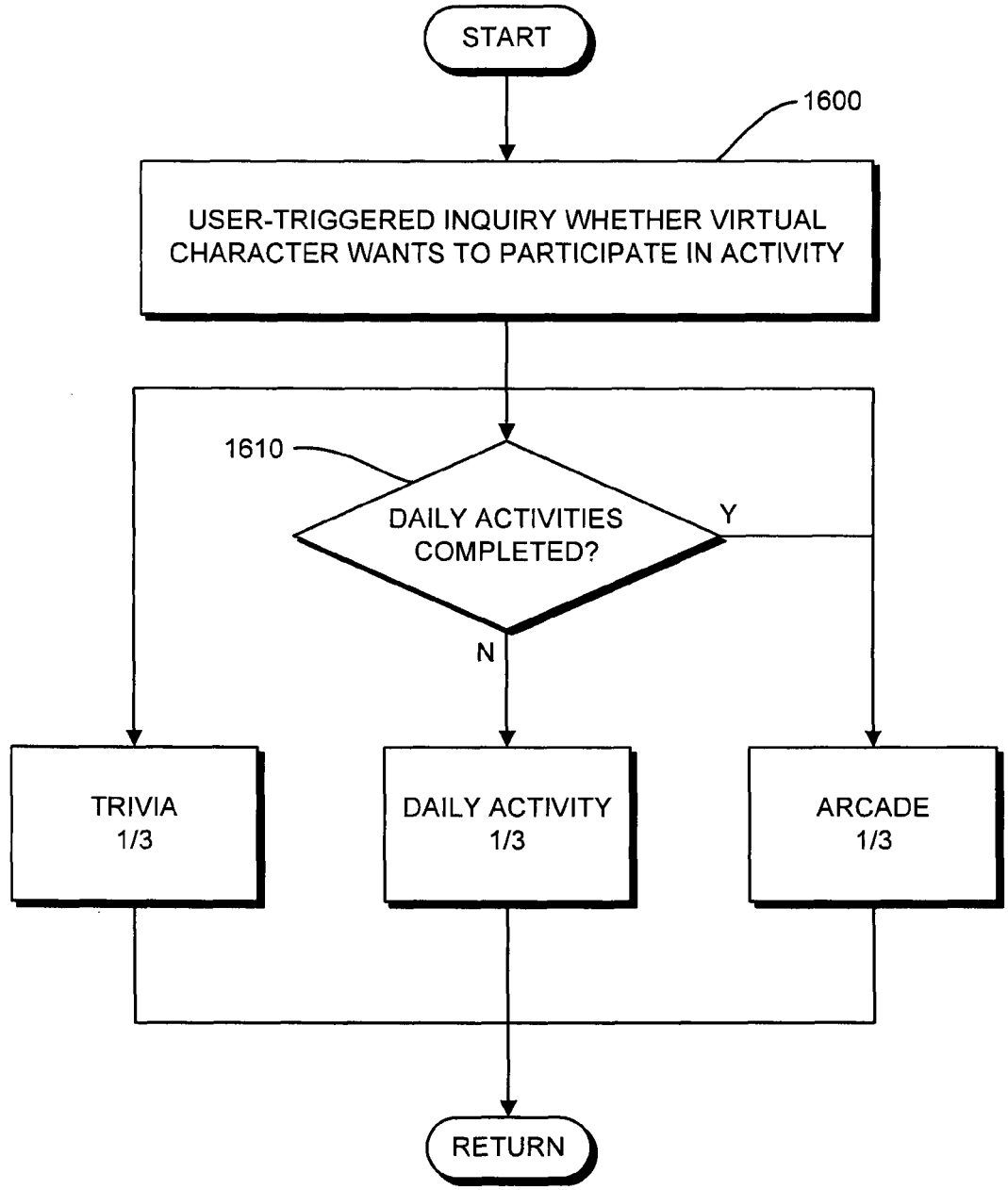
FIG. 16 shows a flow diagram illustrating a method of preparing a communication including content related to an activity parameter according to an aspect of the present invention.

The step of preparing the communication 514 to include content related to the activity parameter can best be understood with reference to the diagram of FIG. 16. As shown, the user can trigger preparation of the communication 514 by inputting a command via the "Speak to Virtual Character" button 518, or the preparing of the communication 514 can be initiated randomly, when the virtual character 500 is in the virtual room 502 or other portion of the virtual environment. Likewise, as with preparing the communication related to any of the parameters, preparing the communication 514 to include content related to the activity parameter can also be triggered based on a value of one or more of the parameters.

In FIG. 16, in response to the detection of the user's selection of the "Speak to Virtual Character" button 518 at step 1600, for example, there is an equal probability that the content of the communication will be selected as a suggested activity that the user can participate in via the user computer 18 and the virtual character 500. If, however, the suggestion of a daily activity (i.e., an activity that can be completed only once per calendar day) is selected as the content, then at step 1610 it must be determined if all daily activities have already been completed. If so, then an arcade game is suggested as the content of the communication 514 instead of the daily activity. The particular arcade game suggested as the content of the communication 514 can be selected randomly, or based on popularity or any other suitable criteria. Examples of suitable alternatives to daily activities and arcade games include trivia questions, and the like. Selection of a topic for the trivia questions to be asked can optionally be accomplished based on the number of questions in each category previously answered by the user. For example, if a user has answered 50 Languages questions and 100 Social Studies questions, the suggested category of trivia questions selected as the content of the communication 514 is more likely to be Languages than Social Studies, since the user has answered fewer Languages questions.

If it is determined at step 1610 all daily activities have not been completed, then one or more of the daily activities is selected and suggested as the content of the communication 514. The relative probabilities of selecting any of the activities as the content related to the activity parameter can be adjusted as desired without departing from the scope of the present invention.

Figure 17:
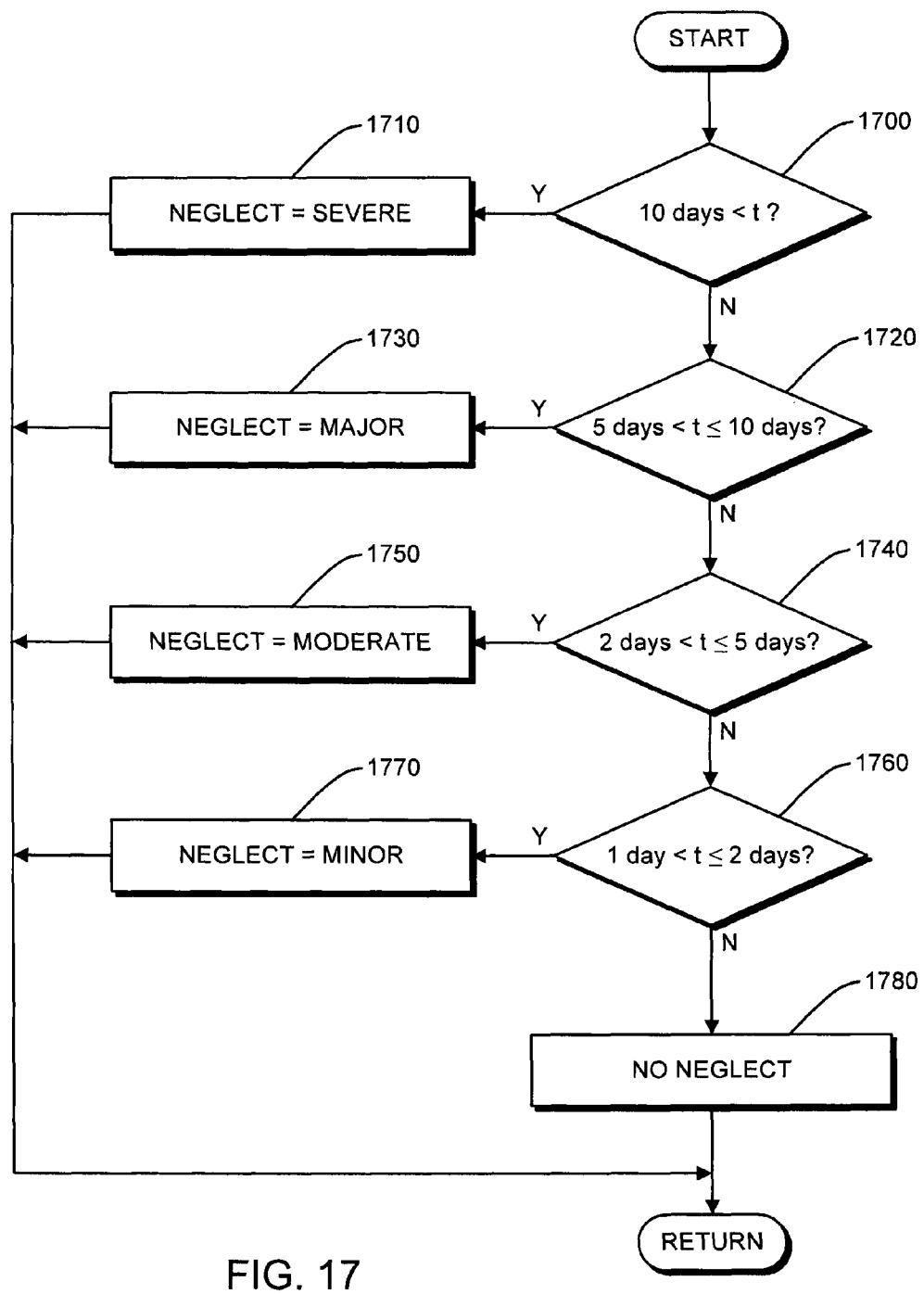
FIG. 17 shows a flow diagram illustrating a method of preparing a communication including content related to a neglect parameter according to an aspect of the present invention.

The step of preparing the communication 514 to include content related to the neglect parameter can best be understood with reference to the diagram of FIG. 17. As mentioned above, the neglect parameter relates to a length of time since the virtual character 500 was last controlled by the user; a length of time since the user last participated in a specific activity, or an activity in general; or a combination thereof. If the user fails to log in an interact with the virtual character 500 for prolonged, predetermined periods of time the virtual character 500 will automatically generate a communication 514 including content related to the neglect parameter without user intervention the next time the user logs in to the virtual environment to interact with the virtual character 500.

As shown in FIG. 17, the content of the communication 514 relating to the neglect parameter is selected based on the length of time that has elapsed since the user last logged in to the virtual environment and interacted with the virtual character 500 until the most recent logging in to the virtual environment and interaction with the virtual character 500. At step 1700, it is determined if this length of time lasted longer than 10 days. If yes, then the content relating to the neglect parameter is selected as being indicative of severe neglect of the virtual character 500 at step 1710. If not, then it is determined at step 1720 if this length of time was greater than five (5) days and less than or equal to ten (10) days. If yes, then the content relating to the neglect parameter is selected as being indicative of major neglect of the virtual character 500 at step 1730. If not, then it is determined at step 1740 if this length of time was greater than two (2) days and less than or equal to five (5) days. If yes, then the content relating to the neglect parameter is selected as being indicative of moderate neglect of the virtual character 500 at step 1750. If not, then it is determined at step 1760 if this length of time was greater than one (1) day and less than or equal to two (2) days. If yes, then the content relating to the neglect parameter is selected as being indicative of minor neglect of the virtual character 500 at step 1770. If not, then the content relating to the neglect parameter is selected as being indicative of no neglect of the virtual character 500 at step 1780. According to alternate embodiments, one or more "emoticons" or other symbols can optionally be selected for inclusion among the content related to the neglect parameter. An emoticon is a symbol or combination of symbols used to convey an emotional expression.

Referring once again to FIG. 8, once the content of the communication 514 has been selected as relating to the parameter(s) evaluated, the transmission of the communication 514 from the virtual character 500 is initiated at step 830. Transmission of the communication 514 can take the form of a comment "bubble" appearing to extend from the mouth of the virtual character 500 as shown in FIG. 5, a comment "bubble" extending from an image 516 of the virtual character 500 in the dock 504, audibly broadcasting the communication 514, or otherwise conveying the content of the communication from the virtual character 500 to the user via the user computer 18.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The invention has been described hereinabove using specific examples; however, it will be understood by those skilled in the art that various alternatives may be used and equivalents may be substituted for elements or steps described herein, without deviating from the scope of the invention. Modifications may be provided to adapt the invention to a particular situation or to particular needs without departing from the scope broadcasting the communication 514, or otherwise conveying the content of the communication from the virtual character 500 to the user via the user computer 18.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The invention has been described hereinabove using specific examples; however, it will be understood by those skilled in the art that various alternatives may be used and equivalents may be substituted for elements or steps described herein, without deviating from the scope of the invention. Modifications may be provided to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

The invention claimed is:

1. A method of providing a virtual presentation for entertaining a user, the method comprising:

using a user computer for generating a virtual environment that includes at least one virtual object;

displaying a virtual character that represents a real-world item in the virtual environment;

accepting controls for the virtual character in the virtual environment to interact with the virtual environment responsive to commands input by the user via a user computer;

using a processor component provided to the user computer, evaluating a parameter associated with at least one of the virtual object and the virtual character, where said parameter varies at different times, and relates to a condition of said at least one of said virtual object and said virtual character;

responsive to the evaluating, automatically preparing with the processor component a communication from the virtual character to be transmitted to the user without user intervention, wherein the communication includes content comprising a readable message related to the parameter evaluated, and where said readable message is selected from among a plurality of different readable messages, each of said plurality of different readable messages having a different probability of being selected related to the value of the parameter evaluated, allowing said content included in said communication to be different at a first time than at a second time based on a determination of said value resulting from said evaluating and said probability, and where said first and second times relate to said condition; and initiating transmission of the communication from the virtual character in a way to allow viewing of the readable message on the user computer.

2. The method according to claim 1, wherein the parameter evaluated is associated with at least the virtual object, and the virtual object comprises at least one virtual item selected from a group consisting of: a piece of virtual furniture, a virtual outdoor object, virtual clothing, and a virtual toy.

3. The method according to claim 2, wherein preparing the communication comprises:

identifying the virtual object as a specific object with which the user has caused the virtual character to interact; and relating the readable message of the communication to the specific object.

4. The method according to claim 1, wherein said generating the virtual environment comprises:

receiving a registration code associated with the real-world item transmitted over a communication network;

validating the registration code; and responsive to the validating, displaying a virtual replica of the real-world item as the virtual character.

5. The method according to claim 4, wherein the virtual replica of the real-world object to be displayed as the virtual character is identified by the registration code.

6. The method according to claim 1, wherein the evaluating is initiated: by a user-input command, by achieving a predetermined goal within the virtual environment, randomly, or any combination thereof.

7. The method according to claim 1 wherein the parameter is associated with the virtual character, and is indicative of at least one of a health, happiness and a hunger associated with the virtual character.

8. The method according to claim 7, wherein the readable message of the communication comprises an indication that the at least one of the health, happiness and hunger associated with the virtual character has achieved a predetermined elevated level in response to an effort to further elevate the at least one of the health, happiness and hunger associated with the virtual character.

9. The method according to claim 7, wherein the readable message of the communication comprises an indication that the at least one of the health, happiness and hunger associated with the virtual character has dropped below a predetermined level.

10. The method according to claim 9, wherein the readable message of the communication comprises a suggested treatment of the virtual character with one or more virtual treatments to restore the at least one of the health, happiness and hunger that has dropped below the predetermined level, and wherein the one or more virtual treatments comprises utilizing at least one of a virtual possession of the virtual character, and a virtual sale item that can be purchased for the virtual character.

11. The method according to claim 10, wherein the suggested treatment selected is based on at least one of: a time of day at which transmission of the communication is initiated; and a difference between the at least one of the health, happiness and hunger associated with the virtual character and the predetermined level.

12. The method according to claim 1, wherein the parameter evaluated is associated with the virtual character, and indicates an article of virtual clothing being worn by the virtual character.

13. The method according to claim 12, wherein the readable message of the communication to be transmitted from the virtual character to the user comprises at least one of:

a request to replace the article of virtual clothing currently being worn by the virtual character with another article of virtual clothing;

a compliment on the article of virtual clothing currently being worn by the virtual character;

a request that a new article of virtual clothing be purchased for the virtual character; and a request that the article of virtual clothing in the possession of the virtual character but not currently being worn be placed on the virtual character.

14. The method according to claim 1, wherein the readable message is a written response to a communication from the user intended for the virtual character as a recipient.

15. A method of providing a virtual presentation for entertaining a user, the method comprising:

using a processor component included in a computer system that includes at least a user computer, generating a virtual environment;

generating a virtual character in the virtual environment, wherein the virtual character is associated with at least one parameter, the at least one parameter comprising at least one of a hunger parameter indicating a hunger of the virtual character, a clothing parameter indicating information about clothing, a furniture parameter indicating information about furniture, an activity parameter indicating information about activity and a neglect parameter indicating information about neglect;

with the processing component, evaluating a value of the at least one parameter associated with the virtual character;

responsive to said evaluating, using the processing component to prepare a communication from the virtual character to be transmitted, wherein the communication includes content comprising a readable message selected from among a plurality of different readable messages, each of said plurality of different readable messages having a different probability of being selected related to the value of the at least one parameter evaluated, wherein the probability of each of the plurality of different readable messages establishes a likelihood that each of the plurality of different readable messages will be selected for inclusion in the content of the communication, and the likelihood of at least one of the different readable messages is less than a certainty; and initiating transmission of the communication from the virtual character to the user by the user computer.

16. The method according to claim 15, wherein said displaying the virtual character comprises:

receiving a registration code associated with the real-world item and transmitting the registration code over a communication network to be received by a networked computer also included in the computer system;

receiving, with the user computer, a signal indicating successful validation of the registration code by the networked computer; and responsive to receiving the signal indicating successful validation, displaying a virtual replica of the real-world item as the virtual character.

17. The method according to claim 16, wherein the virtual replica of the real-world object to be displayed as the virtual character is identified by the registration code.

18. The method according to claim 15, wherein the evaluating is initiated: by a user-input command, by achieving a predetermined goal within the virtual environment, randomly, or any combination thereof.

19. The method according to claim 15, wherein the readable message of the communication comprises an indication that the at least one parameter evaluated has acquired a predetermined value and suggests a command that the user can input with the user computer to alter the value of the at least one parameter.

20. The method according to claim 19, wherein the at least one parameter evaluated comprises the hunger parameter, and the readable message comprises a suggestion that the user input a feed command that results in feeding of the virtual character.

21. The method according to claim 19, wherein the at least one parameter evaluated comprises the clothing parameter, and the readable message comprises a suggestion that the user input at least one of the following commands:

a replace command that results in replacement of an article of virtual clothing currently being worn by the virtual character with another article of virtual clothing;

a purchase command that results in a new article of virtual clothing being purchased for the virtual character; and a dress command that results in dressing the virtual character with an article of virtual clothing possessed by the virtual character but not currently being worn by the virtual character.

22. The method according to claim 15, wherein the readable message of the communication comprises an indication that the at least one parameter evaluated has acquired a predetermined value, a compliment on the at least one parameter acquiring the predetermined value, and a suggestion that a command from the user to alter the value of the at least one parameter is not desired.

23. The method according to claim 15, wherein the at least one parameter evaluated comprises the furniture parameter that indicates the virtual environment lacks a predetermined number of virtual furnishings, and the readable message comprises a suggestion that the user input a command to place a piece of virtual furniture in the virtual environment.

24. The method according to claim 15, wherein the at least one parameter evaluated comprises the activity parameter that indicates that the user has not performed an activity with the virtual character, and the readable message includes a statement suggesting performance of an activity with the virtual character.

25. The method according to claim 24, wherein the readable message includes a statement suggesting performing an activity that can be performed only once each day by the virtual character.

26. The method according to claim 15, wherein the at least one parameter evaluated comprises the neglect parameter that indicates a length of time since the virtual character was last controlled by the user, and the readable message includes a statement related to the length of time.

27. The method according to claim 15, wherein the readable message is a written response to a communication from the user to the virtual character.

28. An entertainment system for allowing interaction between a virtual character and a user comprising:

a computer-based virtual world component operative to generate a virtual environment that includes at least one virtual object;

a computer-based virtual character component operative to display a virtual character that represents a real-world item in the virtual environment, wherein the virtual character is to be controlled in the virtual environment to interact with the virtual object responsive to commands input;

a computer-based evaluation component operative to evaluate a parameter associated with at least one of the virtual object and the virtual character, where said parameter varies at different times, and relates to a condition of said at least one of said virtual object and said virtual character;

a storage component that stores a plurality of different readable messages related to each of the parameter and a second parameter that is different than the parameter, wherein the plurality of readable messages each has a different probability of being selected corresponds to different values of the parameter and the second parameter;

a computer-based communication component operative to, in response to evaluation of the parameter, prepare a communication from the virtual character to be transmitted via said virtual environment, wherein the communication includes content comprising an appropriate readable message selected from among the plurality of different readable messages based in part on the probability of being selected related to the value of the parameter evaluated and to said condition; and a computer-based transmission component operative to initiate transmission of the communication to cause the appropriate readable message to be displayed in a manner that creates an impression the appropriate readable message is being conveyed from the virtual character to the user with the user computer.

29. The entertainment system according to claim 28, wherein the parameter comprises at least one of a hunger parameter, a clothing parameter, a furniture parameter, an activity parameter and a neglect parameter.

30. The entertainment system according to claim 28 further comprising:

a computer-based receipt component operative to receive a registration code associated with a real-world item represented by the virtual character transmitted over a communication network;

a computer-based validation component operative to validate the registration code; and a computer-based display component operative to, in response to the validating, display a virtual replica of the real-world item as the virtual character.

31. The method according to claim 1, wherein the readable message comprises a written request that the user participate in a new activity made available in the virtual environment.

* * * * *

UNITED STATES PATENT AND TRADEMARK OFFICE
CERTIFICATE OF CORRECTION

PATENT NO. : 8,353,767 B1
APPLICATION NO. : 12/172677
DATED : January 15, 2013
INVENTOR(S) : Borst et al.

It is certified that error appears in the above-identified patent and that said Letters Patent is hereby corrected as shown below:

In the Claims:

Column 28, line 40, "corresponds" should read --corresponding--

Signed and Sealed this
Sixteenth Day of April, 2013

Teresa Stanek Rea
*Acting Director of the United States Patent and Trademark Office*